US010552770B2

(12) United States Patent
Brough et al.

(10) Patent No.: US 10,552,770 B2
(45) Date of Patent: Feb. 4, 2020

(54) EFFICIENT SCHEDULE ITEM CREATION

(71) Applicant: Microsoft Technology Licensing, LLC, Redmond, WA (US)

(72) Inventors: Andrew Winslow Brough, Redmond, WA (US); Clea Allington, Seattle, WA (US); Ian Dwyer Curry, Seattle, WA (US); Teslim Abiodun Alabi, Redmond, WA (US); Eva Britta Karolina Burlin, Redmond, WA (US); Shahil Soni, Seattle, WA (US); Malia Morioka Douglas, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 140 days.

(21) Appl. No.: 15/590,252

(22) Filed: May 9, 2017

(65) Prior Publication Data

US 2018/0330291 A1    Nov. 15, 2018

(51) Int. Cl.
*G06F 3/048* (2013.01)
*G06Q 10/06* (2012.01)
*G06Q 10/10* (2012.01)
*G06F 3/0482* (2013.01)

(52) U.S. Cl.
CPC ....... *G06Q 10/0631* (2013.01); *G06F 3/0482* (2013.01); *G06Q 10/1093* (2013.01); *G06Q 10/1097* (2013.01)

(58) Field of Classification Search
CPC .......... G06Q 10/0631; G06Q 10/1093; G06Q 10/1097; G06F 3/0482; G06F 3/0486
See application file for complete search history.

(56) References Cited

U.S. PATENT DOCUMENTS

2008/0175104 A1   7/2008  Grieb et al.
2009/0299810 A1*  12/2009 Jardine .................. G06Q 10/10
                                            705/7.18
2012/0060166 A1   3/2012  Jardine et al.
(Continued)

OTHER PUBLICATIONS

"Turn Your Daily Tasks & Habits into a Game!", http://www.ipoli.io/, Retrieved on: Mar. 21, 2017, 4 pages.
(Continued)

*Primary Examiner* — Anil N Kumar
(74) *Attorney, Agent, or Firm* — Merchant & Gould

(57) ABSTRACT

Efficient creation of a new schedule item is provided. Aspects include a quick create system for enabling an efficient schedule item creation experience when utilizing a scheduling application, such as a calendar application, a task list application, or a to-do list application, or an application with scheduling functionalities. A user can select a quick create option to cause a display of one or more icons designating predefined or learned schedule item types, which can be automatically or selectively moved to a desired timeslot in the user's schedule. In some examples, an icon can be dragged laterally within a timeslot to toggle between schedule item types. When a commitment input is received, a new schedule item is inserted into the user's schedule, and schedule item details are automatically populated into the schedule item based on existing schedule items or based on preset schedule item types.

20 Claims, 31 Drawing Sheets

(56) References Cited

U.S. PATENT DOCUMENTS

| | | | | |
|---|---|---|---|---|
| 2013/0061171 A1* | 3/2013 | Kang | .................... | G06F 3/0481 |
| | | | | 715/800 |
| 2015/0058056 A1 | 2/2015 | Comerford et al. | | |
| 2015/0127465 A1 | 5/2015 | Bonev et al. | | |
| 2015/0347982 A1* | 12/2015 | Jon | .................... | G06Q 10/1095 |
| | | | | 705/7.19 |
| 2017/0344955 A1* | 11/2017 | Kim | .................... | G06F 3/0488 |

OTHER PUBLICATIONS

"SmartDay 3.2.1 for OS X EI Capitan", http://www.leftcoastlogic.com/smartday/for-osx/, Retrieved on: Mar. 21, 2017, 7 pages.

"SmartCal 3.2—User Guide", http://www.leftcoastlogic.com/smartcal/smartcal-3-handy-guide/, Retrieved on: Mar. 21, 2017, 27 pages.

"Transition Guide", http://www.businesscalendar.de/en/transition, Retrieved on: Mar. 21, 2017, 8 pages.

"Changelog for WAVE Calendar iOS App", http://www.wavecalendarapp.com/changelog.html, Retrieved on: Mar. 21, 2017, 13 pages.

"International Search Report and Written Opinion Issued in PCT Patent Application No. PCT/US18/028454", dated Jul. 6, 2018, 17 Pages.

* cited by examiner

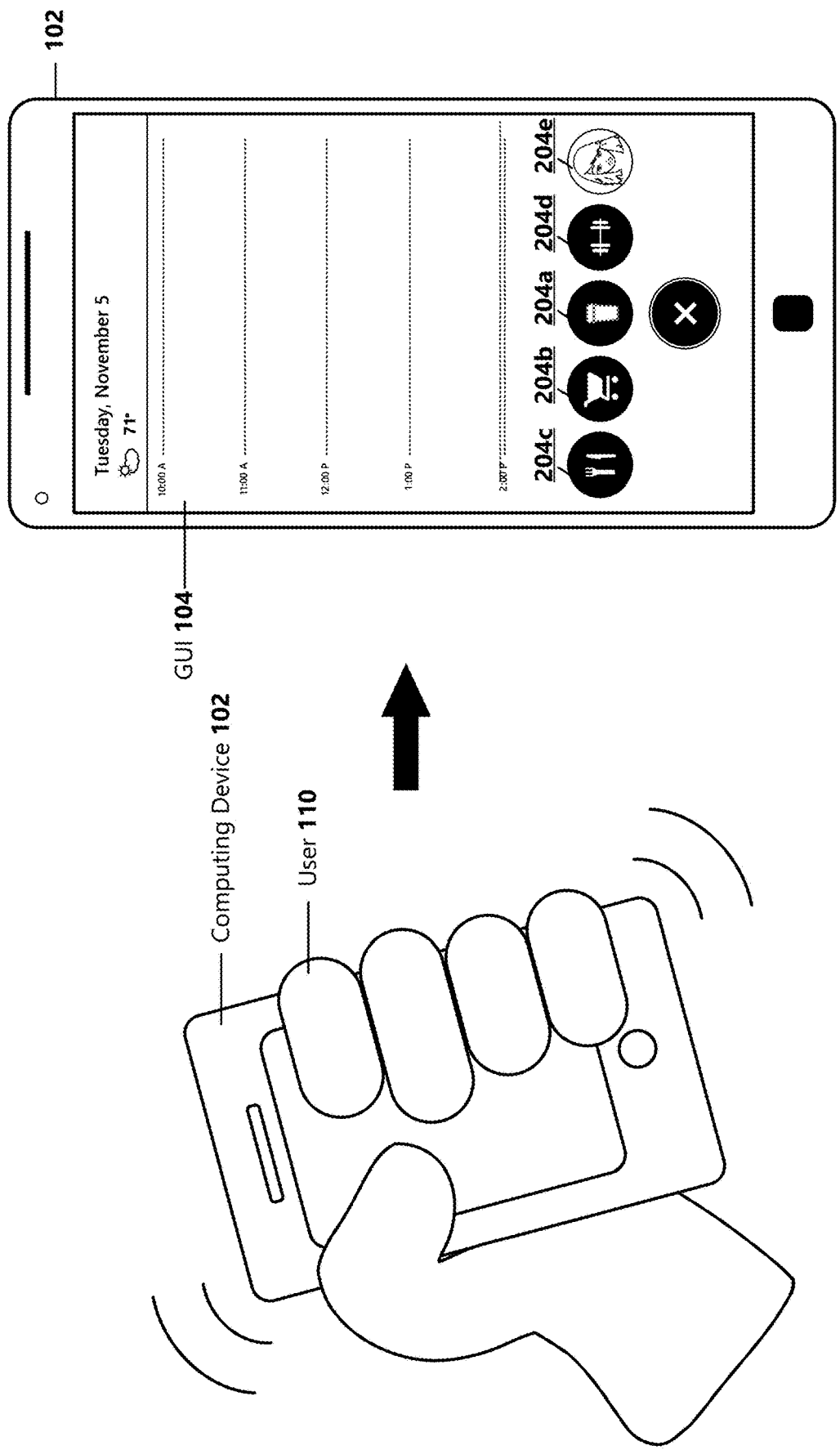

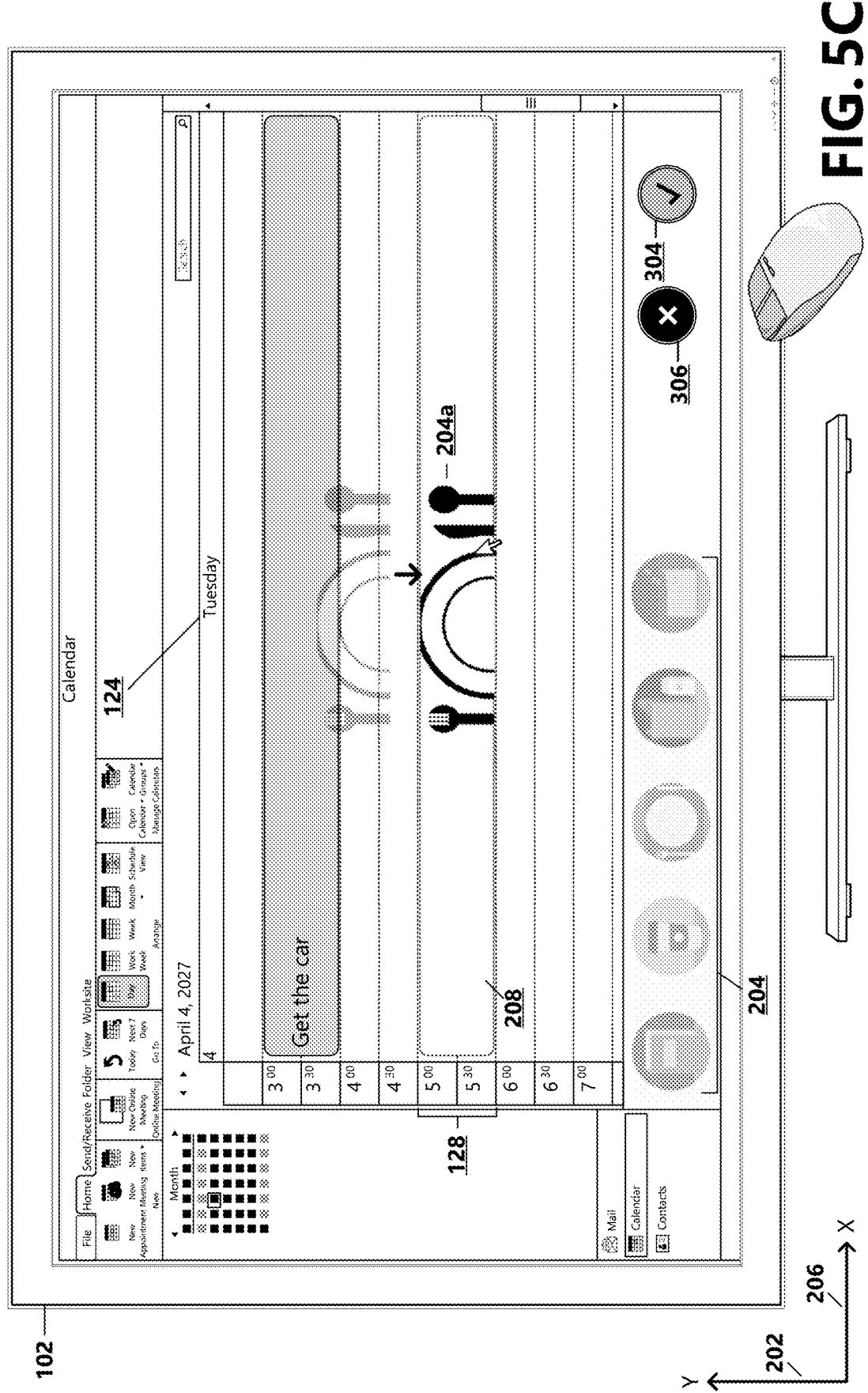

EFFICIENT SCHEDULE ITEM CREATION

BACKGROUND

Computing device users have increasingly come to expect that interaction with their computing devices will be intuitive and efficient. In particular, when utilizing a scheduling application or an application that has scheduling functionalities, users want to be able to create new schedule items, such as events, task items, or to-do items, in a minimal number of steps and with a minimal amount of user input. Further, users are increasingly using small form factor devices, such as mobile phones, tablets, etc., for various tasks. Creating a new schedule item using a small form factor device can be increasingly difficult. For example, it can be difficult to select a desired timeslot or insertion point in a schedule and to type in schedule item details.

Rather than having to open up a form and enter schedule details to create a new schedule item, it is desirable to be able to utilize a quick create functionality that enables the user to efficiently create a new schedule item, potentially without having to lift his/her finger from the device until he/she is ready to commit to add the new schedule item to the user's schedule.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage media for efficiently adding a schedule item to a schedule. A quick create system is provided for enabling an efficient schedule item creation experience when utilizing a scheduling application, such as a calendar application, a task list application, or a to-do list application, or an application with scheduling functionalities. Aspects of the quick create system provide improved user interaction and computer efficiency. For example, the user can select a quick create option to cause a display of one or more icons designating predefined or learned schedule item types, which can be automatically or selectively moved to a desired timeslot in the user's schedule. Further, in some examples, an icon can be moved or dragged laterally to toggle between different schedule item types. When a commitment input is received, a new schedule item is inserted into the user's schedule, and schedule item details are automatically populated into the schedule item based on existing schedule items or based on preset schedule item types. As can be appreciated, users are more likely to use the quick create option to create new schedule items rather than re-entering schedule item content, which can be inefficient.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 4A-4C illustrate a storyboard that shows an example selection input for triggering the quick create system on a mobile computing device;

FIGS. 5A-5F illustrate a storyboard that shows an example use case utilizing aspects of the quick create system on a desktop computing device;

DETAILED DESCRIPTION

Aspects of the present disclosure are directed to a method, system, and computer storage media for efficiently adding a schedule item to a schedule. A quick create system is provided for enabling an efficient schedule item creation experience when utilizing a scheduling application, such as a calendar application, a task list application, or a to-do list application. When adding schedule items, such as events, appointments, to-do items, or task items, one or more schedule item types are displayed based on existing schedule items or based on preset schedule item types. For example, a schedule item type includes details (e.g., schedule item name, location, invitees, or other information) that can be auto-populated into a new schedule item, and is represented by an icon that comprises text, an image, an animated image, an avatar, a photo, a map thumbnail, or other graphical representation that portrays a meaning associated with the schedule item type to the user.

In one example, a create option is provided in a user interface (UI) of a scheduling application, for example, as a button displayed on the screen of the computing device 102. Responsive to actuation of the create option, an icon designating a first schedule item type is displayed. According to one aspect, the user can select and move the icon to a desired timeslot in the schedule. According to another aspect, the user can drag the icon along an axis perpendicular to the timeslots in the user's schedule to toggle between different schedule item types. Upon selection of a desired timeslot and schedule item type, the user can release the icon to create the new schedule item and add the item to the user's schedule. In another example, the create option is actuated via a gesture or other input means. Upon actuation, a plurality of icons designating various schedule item types are displayed in the UI. The user is enabled to select a desired schedule item type, and drag the icon to a desired timeslot in the schedule to create the new schedule item.

Figure 1A:
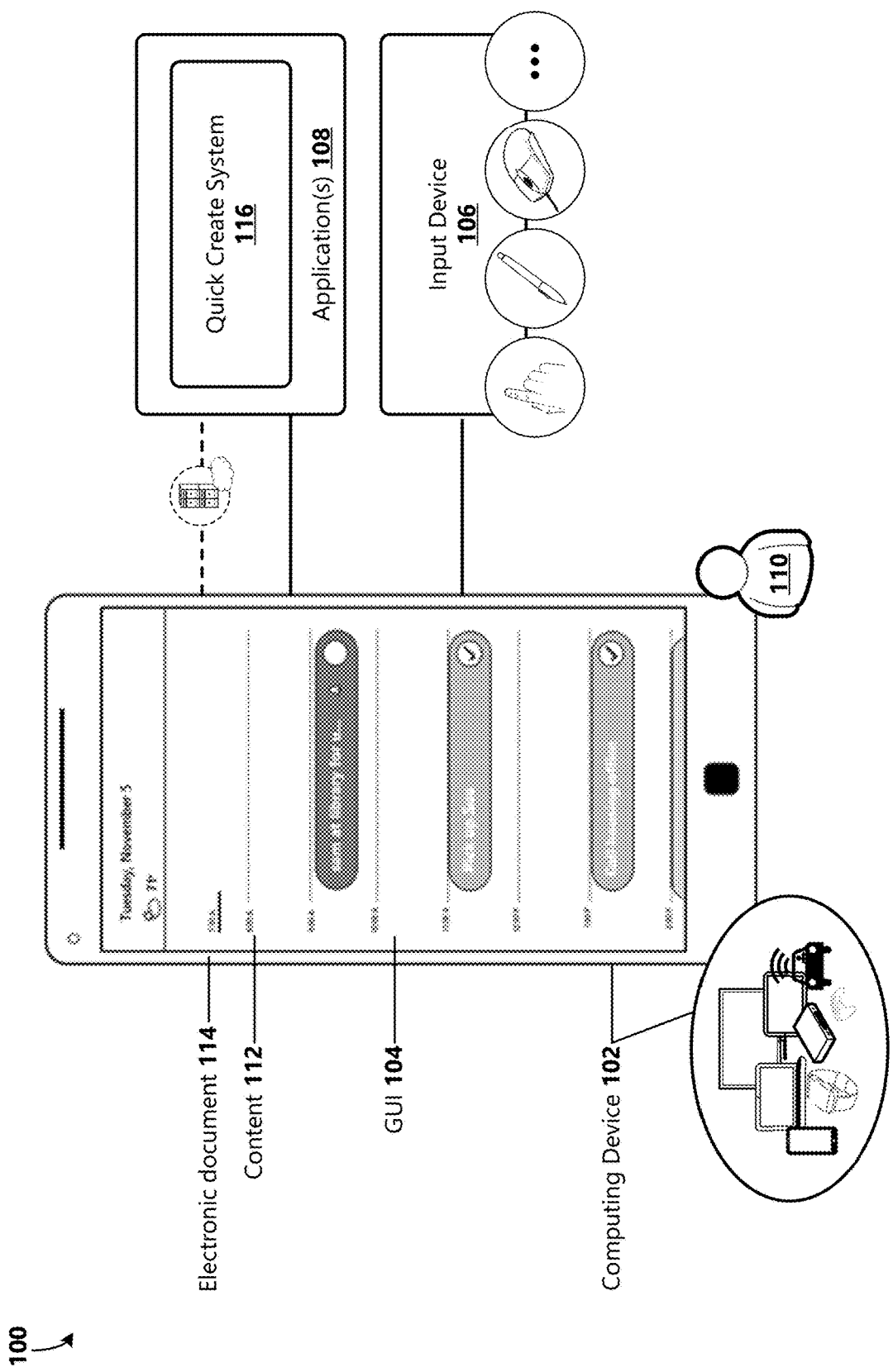
FIG. 1A is a block diagram of an example operating environment including a quick create system for efficiently creating a new schedule item.

As can be appreciated, aspects of the present disclosure advantageously provide an improved method of schedule item creation. For example and as will be described in detail herein, the quick create system provides improved user interaction performance by enabling users to create schedule items in a fewer number of steps and without having to re-enter schedule item details. With reference now to FIG. 1A, an example operating environment 100 including a quick create system 116 is shown in which efficient event item creation is provided. The example operating environment 100 includes a computing device 102, wherein the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device) for executing applications 108 for performing a variety of tasks. The hardware of these computing devices is discussed in greater detail in regard to FIGS. 8, 9A, 9B, and 10.

A user 110 may utilize an application 108 on a computing device 102 for a variety of tasks, which may include, for example, to write, calculate, draw, organize, prepare and view presentations, send and receive electronic mail, take and organize notes, make music, and the like. According to one example, applications 108 include one or more scheduling applications, such as an electronic calendaring application, a to-do list manager, or a task list application, that enable the user 110 to organize appointments, make updates to an agenda, schedule events, schedule task items, keep checklists, etc. Although examples are presented primarily regarding a scheduling application and creation of events in a calendar or tasks in a task list, these are presented as non-limiting examples, as other types of applications 108 may also make use of aspects of the present disclosure for creation of various other types of content items. Applications 108 may include thick client applications, which may be stored locally on the computing device 102, or may include thin client applications (i.e., web applications) that may reside on a remote server and accessible over a network or combination of networks (e.g., the Internet, wide area networks, local area networks). A thin client application may be hosted in a browser-controlled environment or coded in a browser-supported language and reliant on a common web browser to render the application executable on the computing device 102. In one example, application 108 includes a scheduling application API (application programming interface), operative to enable the computing device to employ the quick create system 116 via stored instructions.

Figure 1C:
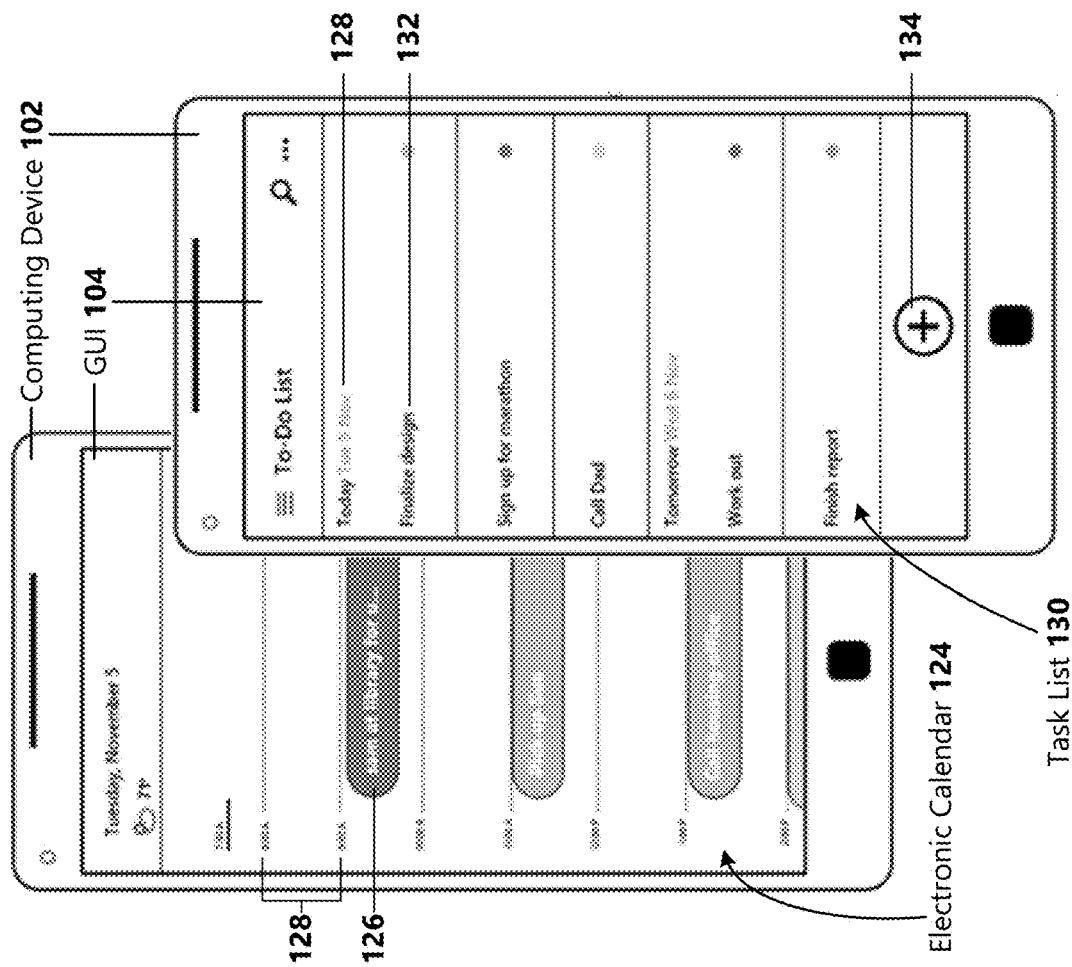
FIG. 1C is an illustration showing two example schedules displayed on mobile computing devices.
Figure 1B:
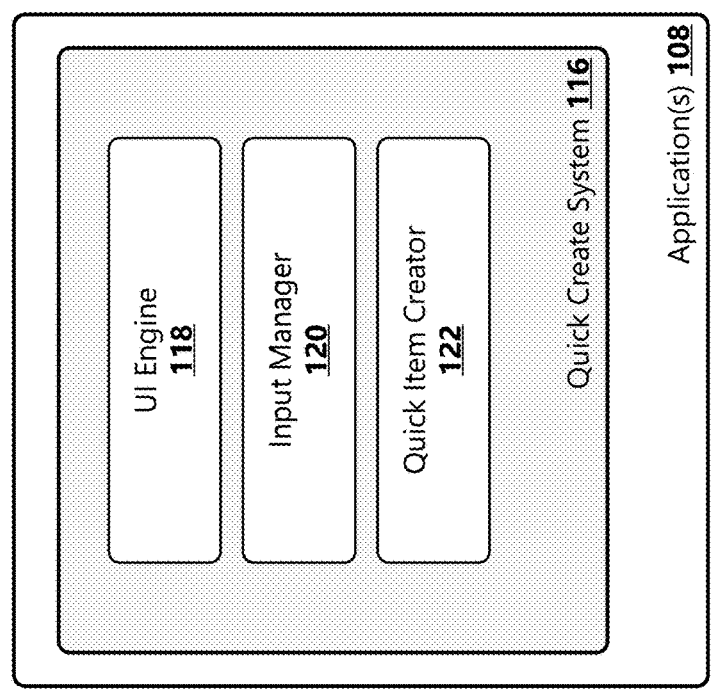
FIG. 1B is a block diagram showing various components of the quick create system.

With reference now to FIG. 1B, according to an aspect, the application 108 (e.g., scheduling application) includes a user interface (UI) engine 118 illustrative of a software module, system, or device operative to generate a display of content 112 and application functionality controls in a graphical user interface (GUI) 104. According to examples, the GUI 104 is provided for enabling the user 110 to interact with functionalities of the application 108 and with content 112 or electronic documents 114 through gestures, manipulation of controls, graphical buttons, visual indicators, and the like. In one example, the UI engine 118 is operative to generate a display of a create option 134 in the GUI 104. According to an aspect, the create option 134 is provided for allowing the user 110 to create a new schedule item, such as an event item in a calendar or a task item in a to-do or task list. As will be described in further detail below, when the create option 134 is selected or actuated, the UI engine 118 is further operative to update the GUI 104 with a display of one or more icons designating one or more schedule item types from which the user 110 is enabled to select. In some examples, the user 110 is enabled to select one icon from a plurality of displayed icons, wherein each icon designates a particular schedule item type. In other examples, the user 110 is enabled to toggle between various schedule item types by dragging or moving a first-displayed icon in a predetermined direction in the GUI 104, and to select a desired schedule item type, for example, by releasing the icon when the icon designating the desired schedule item type is displayed. According to an aspect, selection of a schedule item type enables creation of a new schedule item with details associated with the selected schedule item type.

Content/content items 112 displayed in the application GUI 104 may vary according the application 108 used. For example and with reference to FIG. 1C, content 112 displayed in the GUI 104 of an electronic calendar application may include an electronic calendar 124 comprised of timeslots 128 and event items 126 or task items 132 scheduled within selected timeslots. As another example, content 112 displayed in the GUI 104 of a task list application may include a task list 130 comprised of task items 132 or to-do list items that may or may not be temporally ordered.

With reference again to FIG. 1B, the application 108 (e.g., scheduling application) further includes an input manager 120 illustrative of a software module, system, or device operative to receive user input. According to examples, the input manager 120 receives user input and communicates the user input in the form of messages. In some examples, the user input includes a physical act or motion performed on or by an input device 106 at a position of a user-controlled cursor (such as a mouse cursor, a touch-point on a touch-screen interface, a focus-point on a motion gesture detection device, or head, eye, or gaze tracking device). Various user interface technologies may be utilized. For example, user input may be received via hardware input devices, such as mice, keyboards, remote controls, pen/stylus, a camera, and the like. As another example, user input may be received via natural input devices/methods that enable a user 110 to interact with the computing device 102 in a "natural" manner, such as those relying on speech recognition, touch and stylus recognition, gesture recognition both on screen and adjacent to the screen, air gestures, head and eye tracking, voice and speech, vision, touch, hover, gestures, device movement, and machine intelligence.

According to one example, the user 110 uses an input device 106 to select or actuate the create option 134 to cause a display of one or more schedule item type icons, to select an icon designating a desired schedule item type, and in addition or alternatively, to toggle between schedule item type icons for efficient creation of a new schedule item (e.g., event item, a task item 132, a to-do item). In other examples, the create option 134 is not displayed in the GUI 104, but is a functionality actuable by other user input methods are used, such as by shaking the computing device 102 or rotating the computing device. Other user input methods are possible and are within the scope of the present disclosure. According to an aspect, the input manager 120 is operative to receive the user input, and pass the input to the quick item creator 122.

With reference still to FIG. 1B, the application 108 (e.g., scheduling application) further includes a quick item creator 122 illustrative of a software module, system, or device operative to efficiently create an event 126 or task item 132 in the user's schedule (e.g., calendar 124, to-do list, or task list 130) based at least on the selected schedule item type. According to one aspect, the quick item creator 122 is further operative to store details associated with one or more schedule item types and an icon associated with each schedule item type. As used herein, the term "icon" is utilized to describe a graphical representation that portrays a meaning associated with a schedule item type to the user, such as an image, an animated image, avatar, photo, text, etc. In some examples, schedule item type details are pre-entered by the user 110. For example, the user 110 may selectively customize a schedule item type with one or more scheduling details, such as a subject or title, a location, invitees, notes, etc. Further, the user can selectively customize a schedule item type via selecting or generating an icon to represent the schedule item type.

In other examples, a schedule item type is automatically generated based on existing or previously-entered schedule items in the user's calendar 124 or task list 130. For example, the user 110 may recurrently enter an event item 126, such as "chiropractor appointment," in his/her calendar 124. Accordingly, the quick item creator 122 is operative to create and store a schedule item type associated with the chiropractor appointment event item that includes details based on the previously-entered detail data. For example, details such as the chiropractor's name, the office address, insurance information, patient ID information, etc., can be stored in association with the "chiropractor appointment" schedule item type and used to automatically fill in or complete schedule item details when the "chiropractor appointment" schedule item type is selected for creation of a new schedule item. Further, an icon may be automatically applied to the schedule item type, or alternatively, the user 110 is enabled to select and apply a desired icon to the schedule item type. An automatically-applied icon may be chosen based on keyword recognition. For example, a graphical representation of a spine or a healthcare symbol may be determined to be an appropriate representation for "chiropractor," and applied to the "chiropractor appointment" schedule item type.

According to an aspect, when user input is received in association with actuation of the create option 134, one or more icons associated with one or more schedule item types are displayed in the GUI 104. In some examples, the icons provided for display in the GUI 104 are associated with a subset of a larger set of schedule item types. The schedule item types represented in the subset may be included based on frequency of use, recency of use, or user-settings. In some examples, the schedule item type icons displayed in the GUI 104 are based on a currently selected or displayed date (e.g., day, week, or month). For example, schedule item type icons provided for display may differ when a currently selected date in the user's calendar 124 is a weekday versus a weekend day.

Figure 2A:
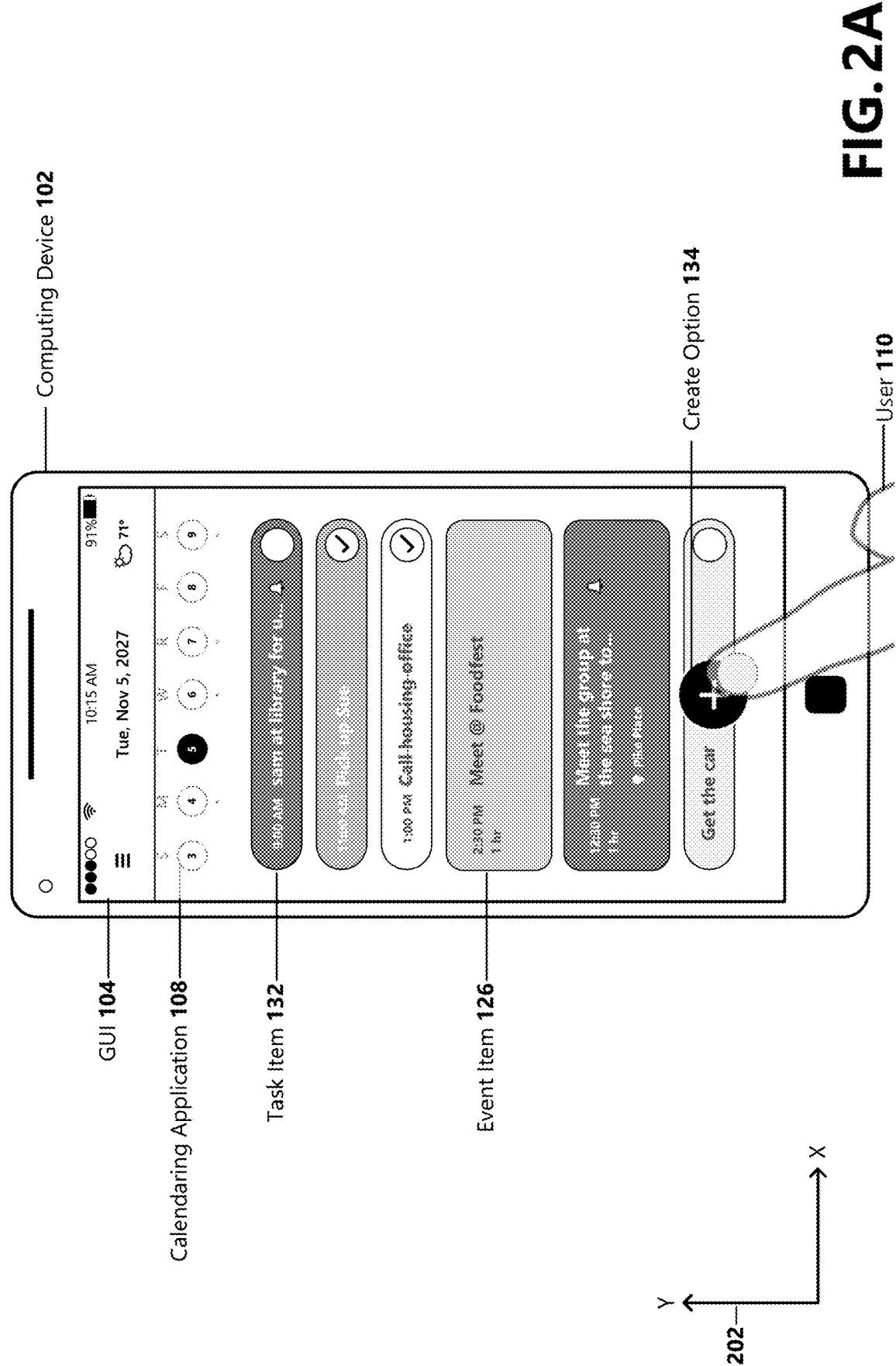
FIGS. 2A-2H illustrate a storyboard that shows an example use case utilizing aspects of the quick create system on a mobile computing device.

FIGS. 2A-2H are illustrations that show examples of various aspects of quick schedule item (e.g., event items 126, tasks 132) creation in a calendar 124 on a mobile computing device 102. With reference now to FIG. 2A, the example application 108 is embodied as a calendaring application or an application that has calendaring functionalities, wherein a plurality of schedule items are listed displayed along a first axis 202. In the illustrated example, the schedule items are listed displayed vertically down the screen along a Y axis, and a create option 134 is displayed in the GUI 104. As illustrated, the user 110 selects the create option 134 by long-pressing the create option. As should be appreciated, other selection methods are possible and are within the scope of the present disclosure.

Figure 2B:
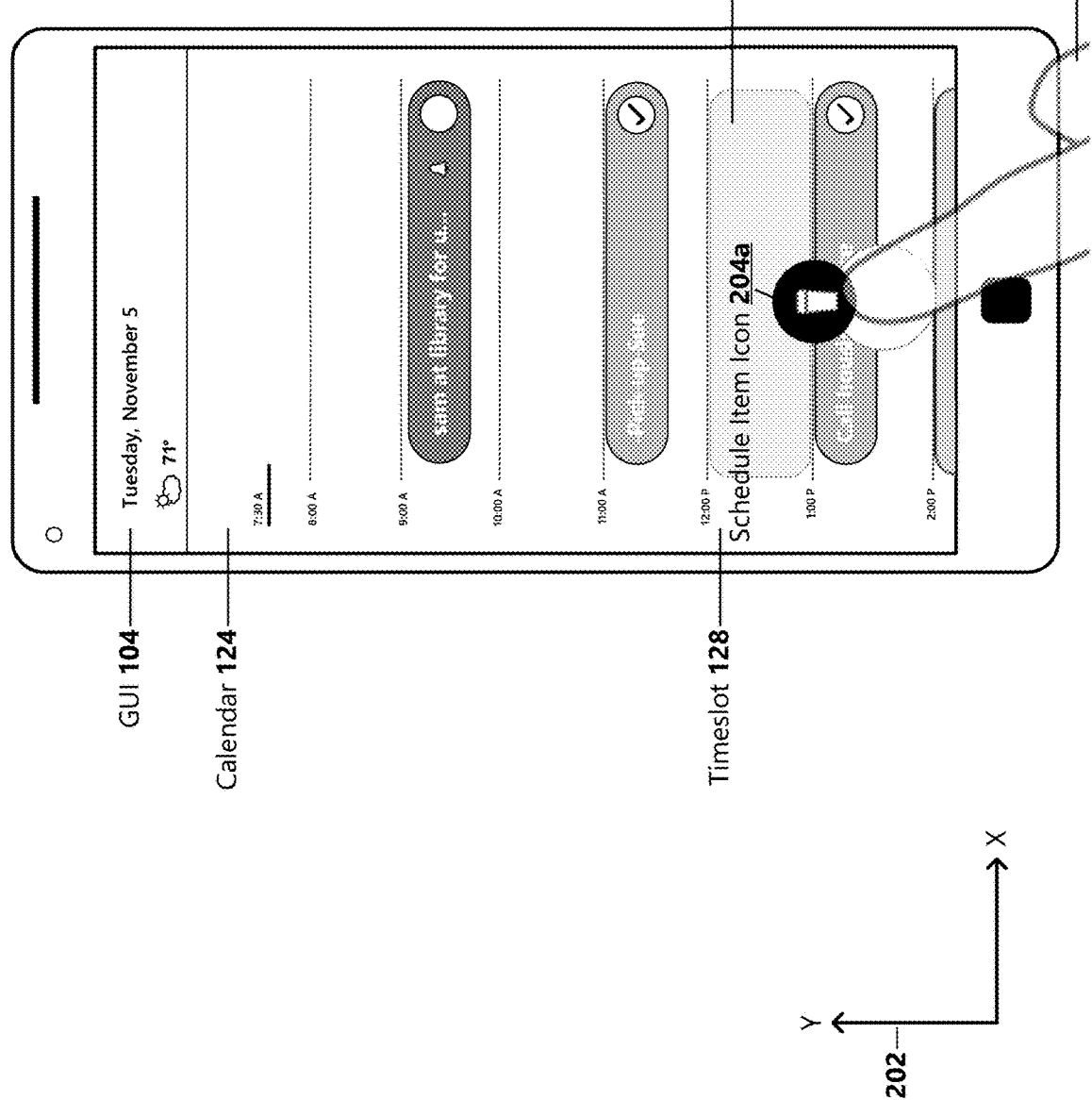

With reference now to FIG. 2B and according to one aspect, responsive to the selection of the create option 134, an icon 204a designating a first schedule item type is displayed in the GUI 104. In some examples, the GUI 104 is updated such that a first available timeslot 128 in the user's calendar 124 or task list 130 is displayed and located near the location of the user-controlled cursor (e.g., finger or stylus on a touchscreen display, mouse, gaze, or gesture cursor). For example, the calendar 124 may be scrolled to a position where the first available timeslot 128 in the currently selected day is displayed near the user-controlled cursor, and a preview new schedule item 208 is shown in the timeslot 128. In other examples, the GUI 104 is updated such that a default timeslot 128 in the user's calendar 124 or task list 130 is displayed and located near the location of the user-controlled cursor, and a preview new schedule item 208 is shown in the default timeslot 128. The preview new schedule item 208 shows the user 110 where a new schedule item will be inserted upon receiving a committal input (e.g., releasing the icon 204, selecting a commit button, providing a commit command). In the illustrated example, the icon 204a is portrayed as a graphical representation of a coffee cup that designates, for example, a "coffee date" schedule item type. In some examples, the first schedule item type is presented first as a suggested most-relevant schedule item type, wherein a schedule item type's relevancy is based on frequency of use, recency of use, user-settings, or context (e.g., time-based or location-based). According to an aspect, when a committal input is made by the user 110, the preview new schedule item 208 is converted into a new schedule item that is added to the user's schedule (e.g., calendar 124 or task list 130). Until the committal input is made or until the new schedule item creation task is cancelled, the preview new schedule item 208 remains a preview item.

Figure 2C:
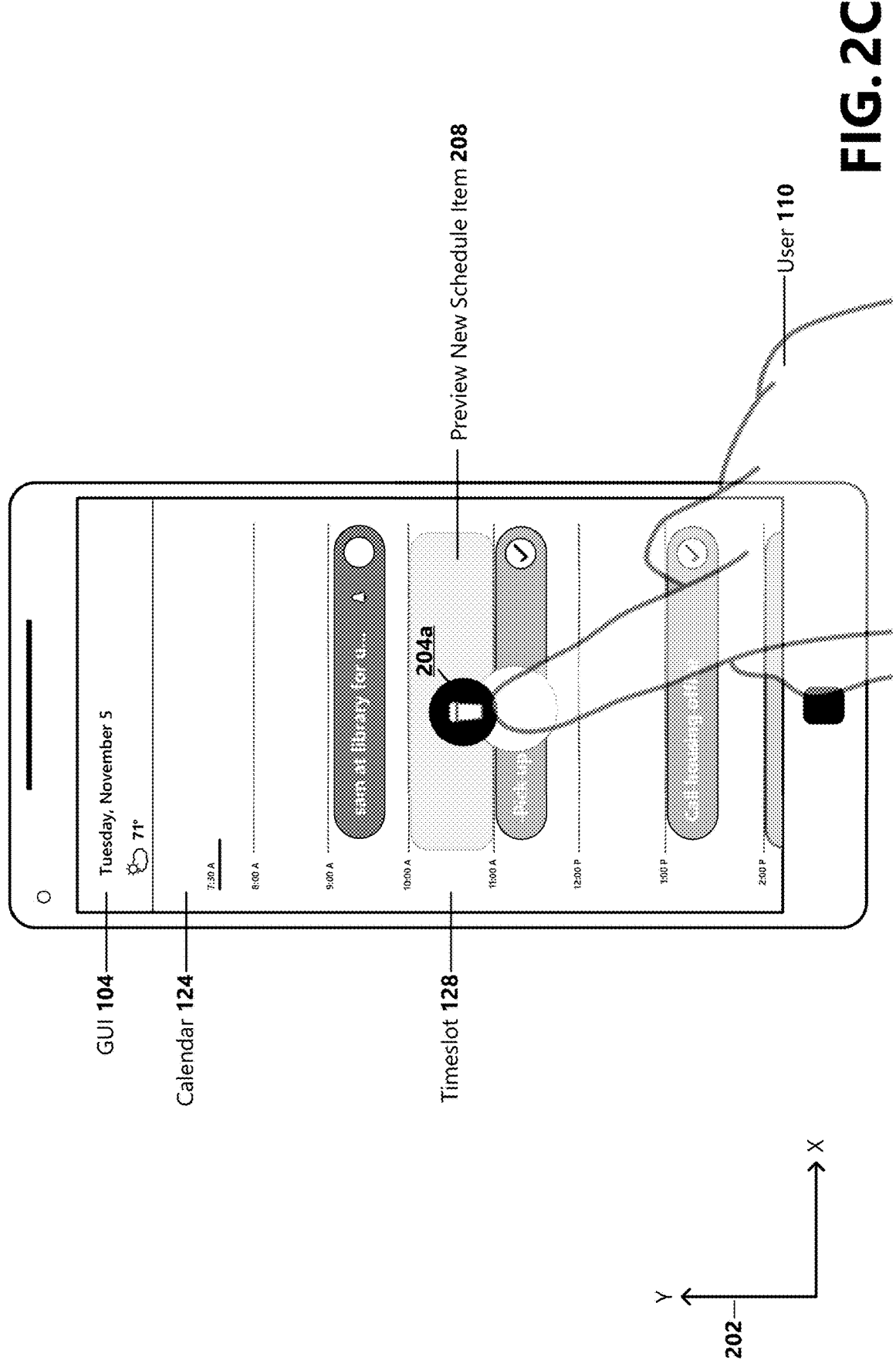

In various examples and with reference now to FIG. 2C, the schedule item type icon 204a can be moved into another timeslot 128 or into another position in a task list 130. For example, the user 110 can drag the icon 204a, and correspondingly the preview new schedule item 208, vertically or along the first axis 202 to a desired timeslot 128 in the calendar 124.

Figure 2D:
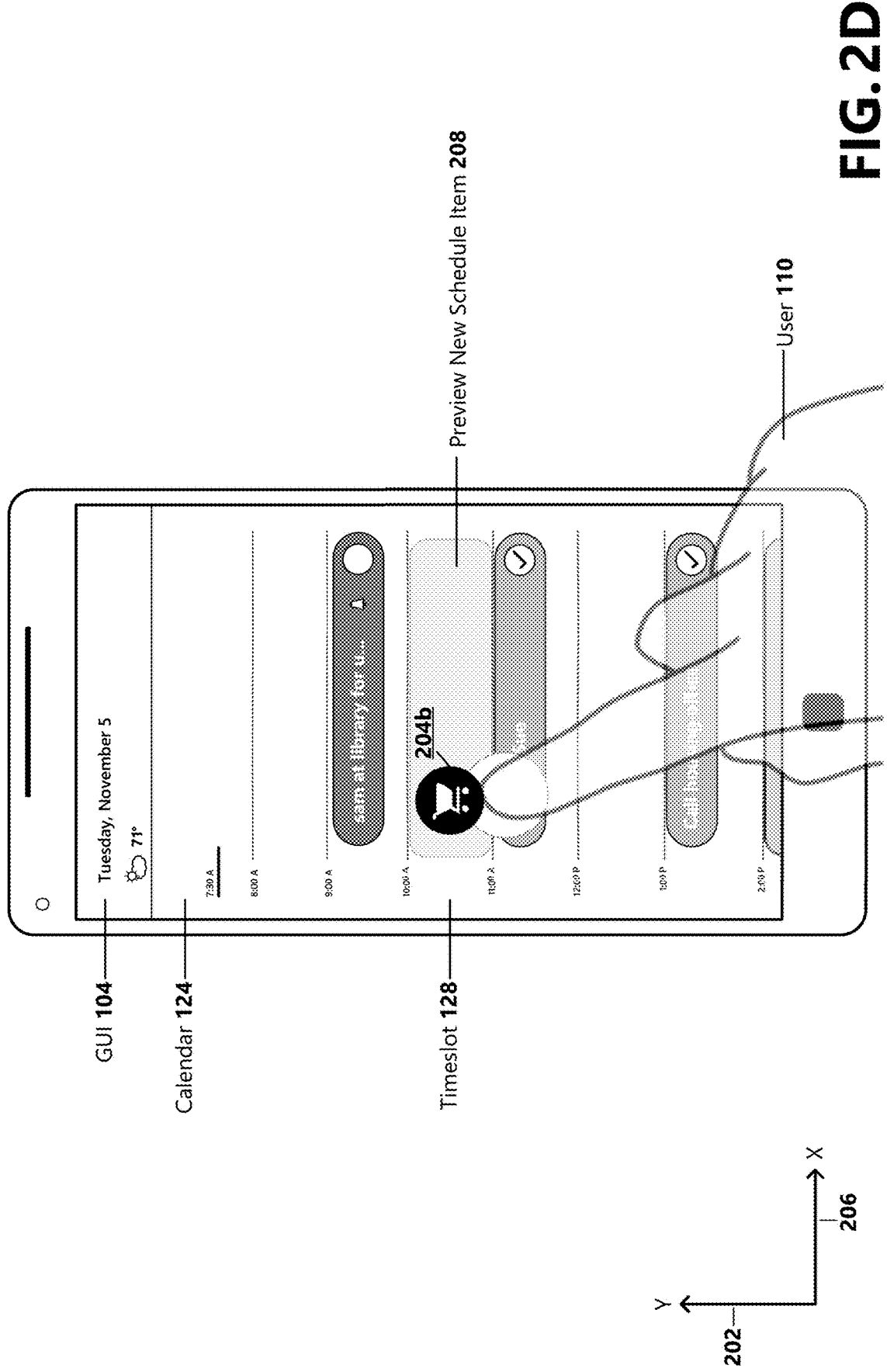

According to an aspect and with reference now to FIG. 2D, the user 110 is enabled to drag the icon 204a along a second axis 206 to toggle between other schedule item types, wherein the second axis is perpendicular to the first axis 202 and the listing of schedule items. The second axis 206 is divided into intervals, where each interval is associated with a particular schedule item type. According to one example, the interval associated with the first schedule item type is positioned in the center of the computing device screen. As the user 110 selectively drags the schedule item icon 204 along the second axis 206 into a particular interval, the icon is updated and transformed to the icon designating the schedule item type associated with the particular interval. In some examples, the schedule item type associated with each interval is determined based on relevance to the user (e.g., based on frequency of use, recency of use, user-settings, or context). For example, schedule item types that are most frequently used may be located near the center of the screen. In the example illustrated in FIG. 2D, the user 110 has moved the icon 204a designating the first schedule item type laterally or along the second axis 206 to another interval, which causes the quick create system 116 to update the GUI 104 to display an icon 204b designating a second schedule item type. In the illustrated example, the icon 204b designating the second schedule item type is a graphical representation of a shopping cart designating a "shopping" schedule item type.

Figure 2E:
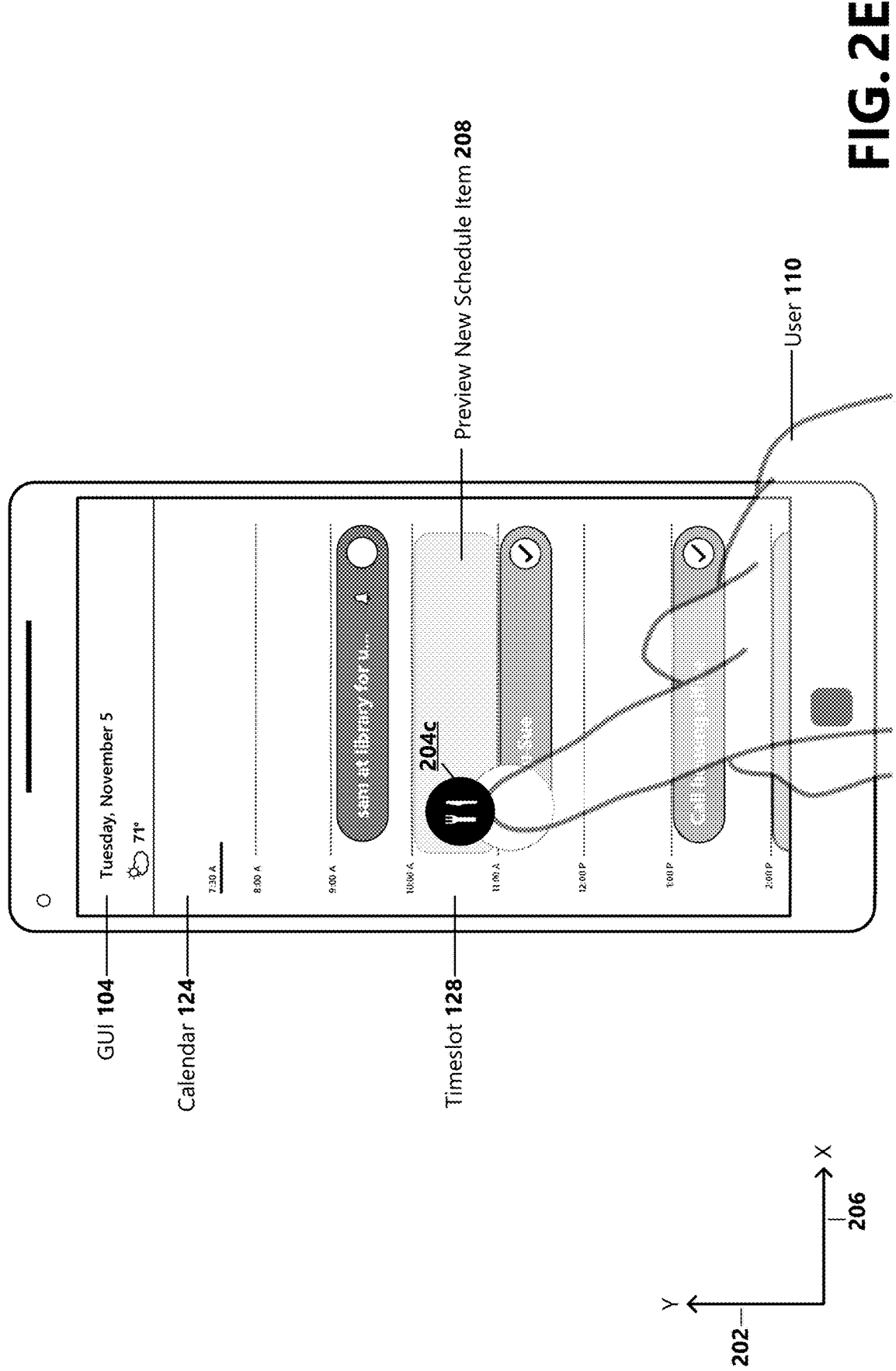
Figure 2F:
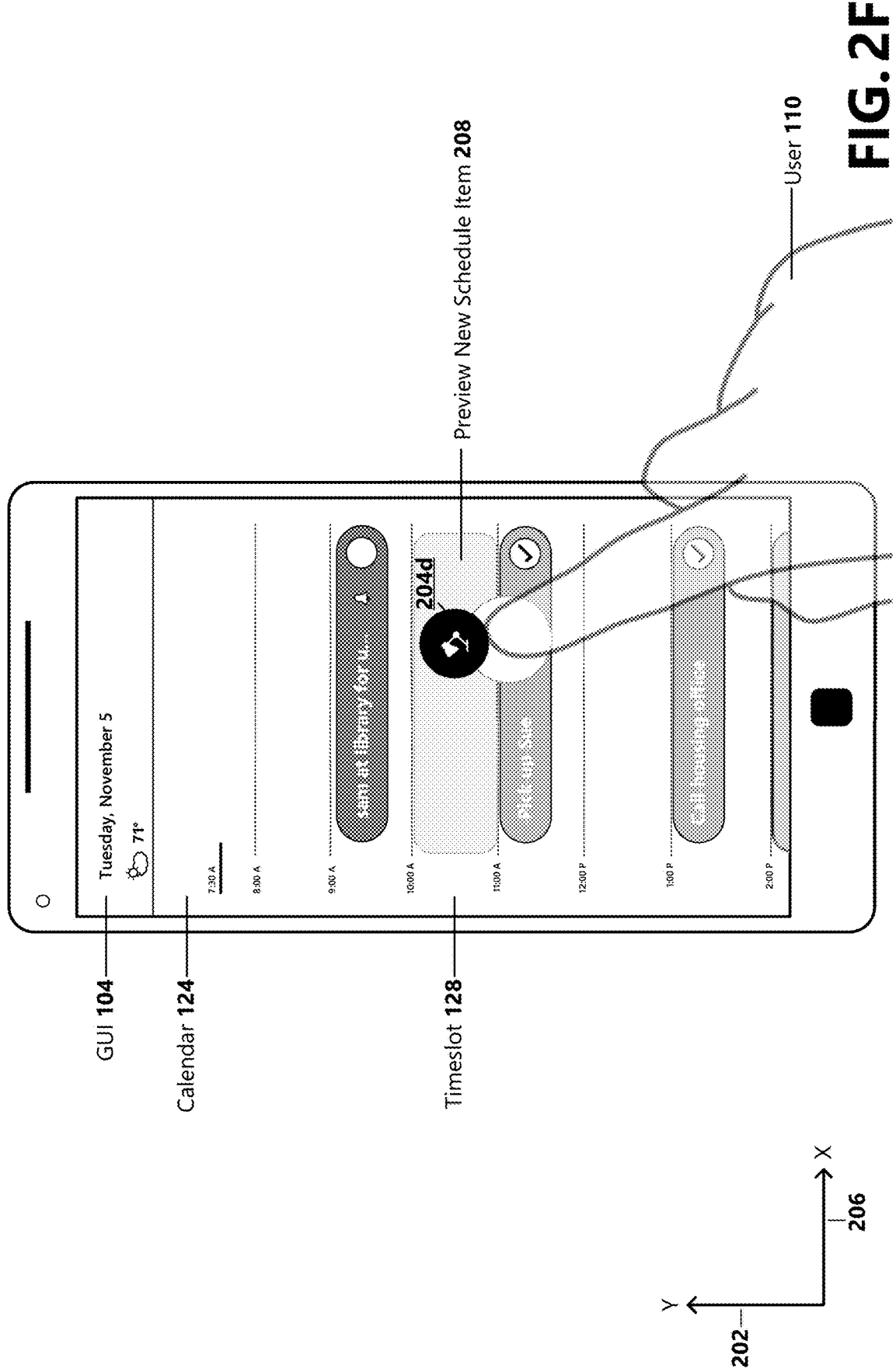
Figure 2G:
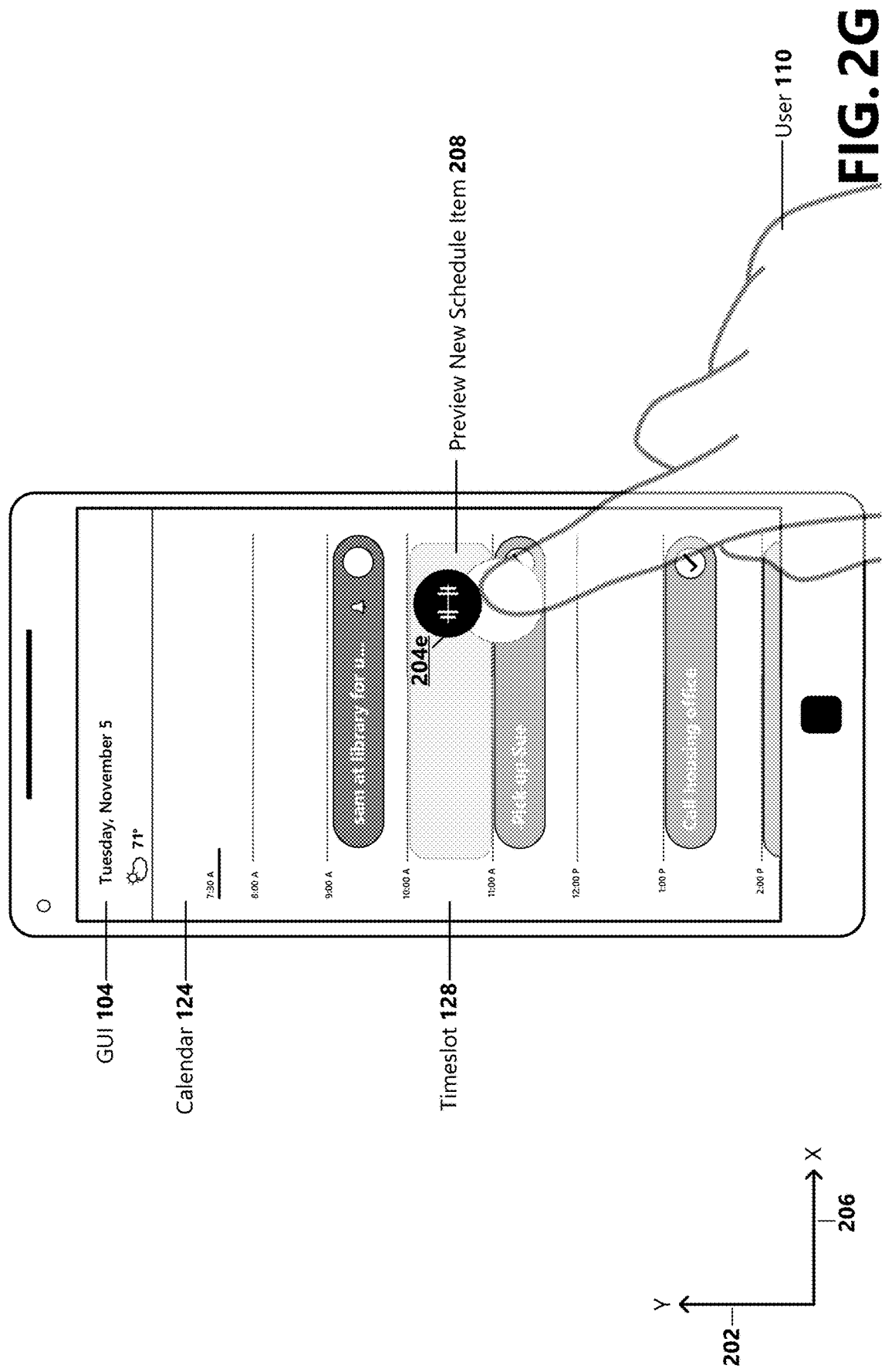

With reference now to FIG. 2E, the user 110 continues to selectively drag the schedule item icon 204b along the second axis 206 into another interval. Accordingly, the icon 204b is updated to an icon 204c designating a third schedule item type associated with the particular interval. In the illustrated example, the icon 204c designating the third schedule item type is a graphical representation of a fork and knife designating a "dining" schedule item type.

With reference now to FIG. 2F, the user 110 again continues to drag the schedule item icon 204c along the second axis 206 into another interval. Accordingly, the icon 204c is updated to an icon 204d designating a fourth schedule item type associated with the particular interval. In the illustrated example, the icon 204d designating the fourth schedule item type is a graphical representation of a lamp designating a "study" schedule item type.

With reference now to FIG. 2G, the user 110 again continues to drag the schedule item icon 204d along the second axis 206 into another interval. Accordingly, the icon 204d is updated to an icon 204e designating a fifth schedule item type associated with the particular interval. In the illustrated example, the icon 204e designating the fifth schedule item type is a graphical representation of a weight designating a "workout" schedule item type.

Figure 2H:
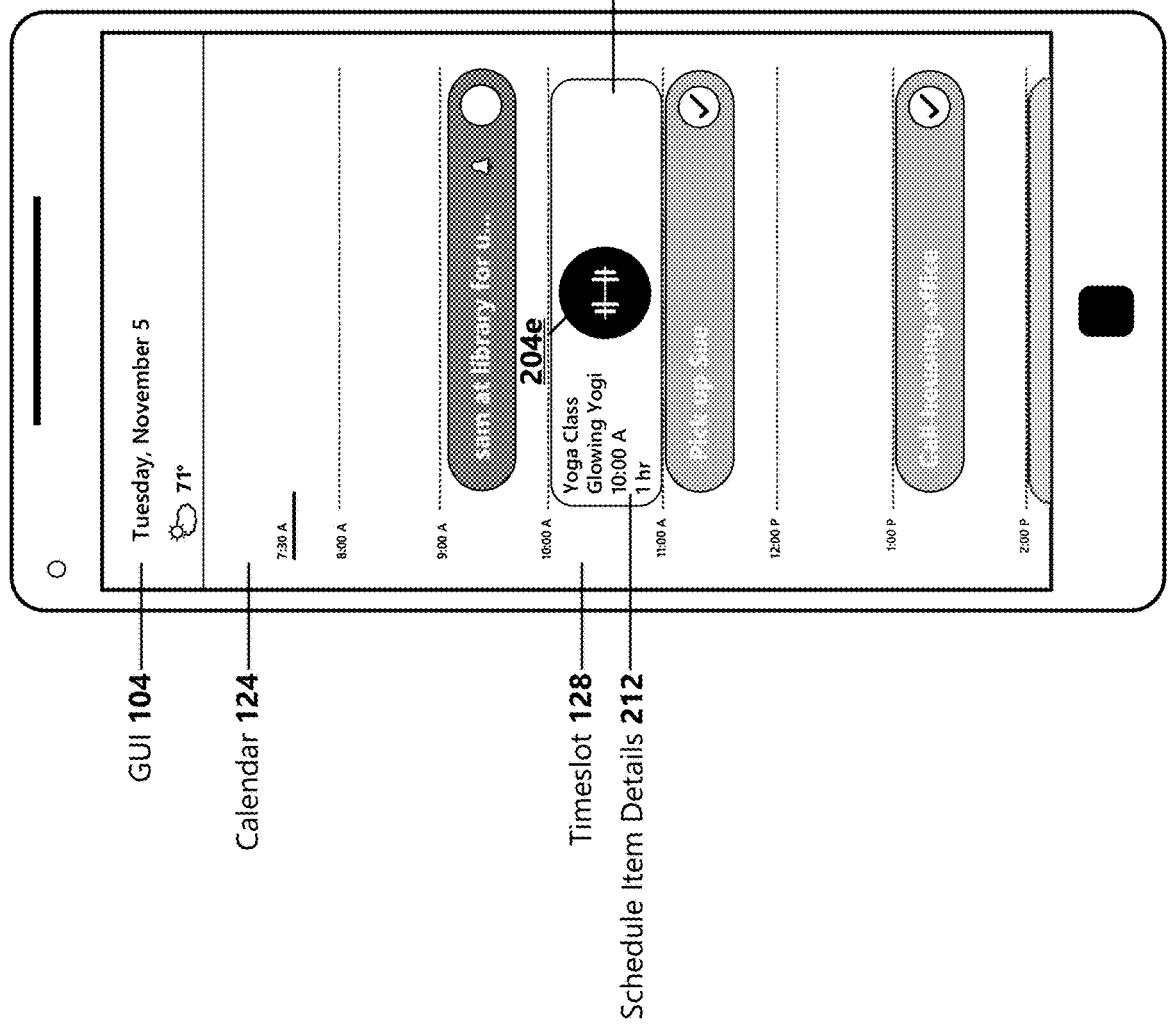

With reference now to FIG. 2H, the user 110 provides committal input by lifting his/her finger from the touchscreen of the computing device 102. As should be appreciated, other committal inputs and input methods are possible and are within the scope of the present disclosure. According to an aspect and as illustrated, responsive to the committal input, the preview new schedule item 208 is converted into a new schedule item 210 and is added to the user's calendar 124. In some examples, the new schedule item 210 is populated with schedule item details 212 associated with the selected schedule item type represented by the icon 204e that was displayed in the GUI 104 when the committal input was received. Consider for example that the fifth schedule item type is associated with attending a yoga class. Accordingly, schedule item details 212 associated with the yoga class are automatically applied to the new schedule item 210, wherein the schedule item details may be pre-entered by the user 110 in association with the fifth schedule item type, or may be automatically filled in based on schedule details in other schedule items in the user's calendar 124. In some examples, a schedule item of a particular schedule item type is represented by a particular color in the schedule. As can be appreciated, the new schedule item is efficiently created and added to the user's calendar 124 with a minimal number of steps and inputs by the user 110.

Figure 3A:
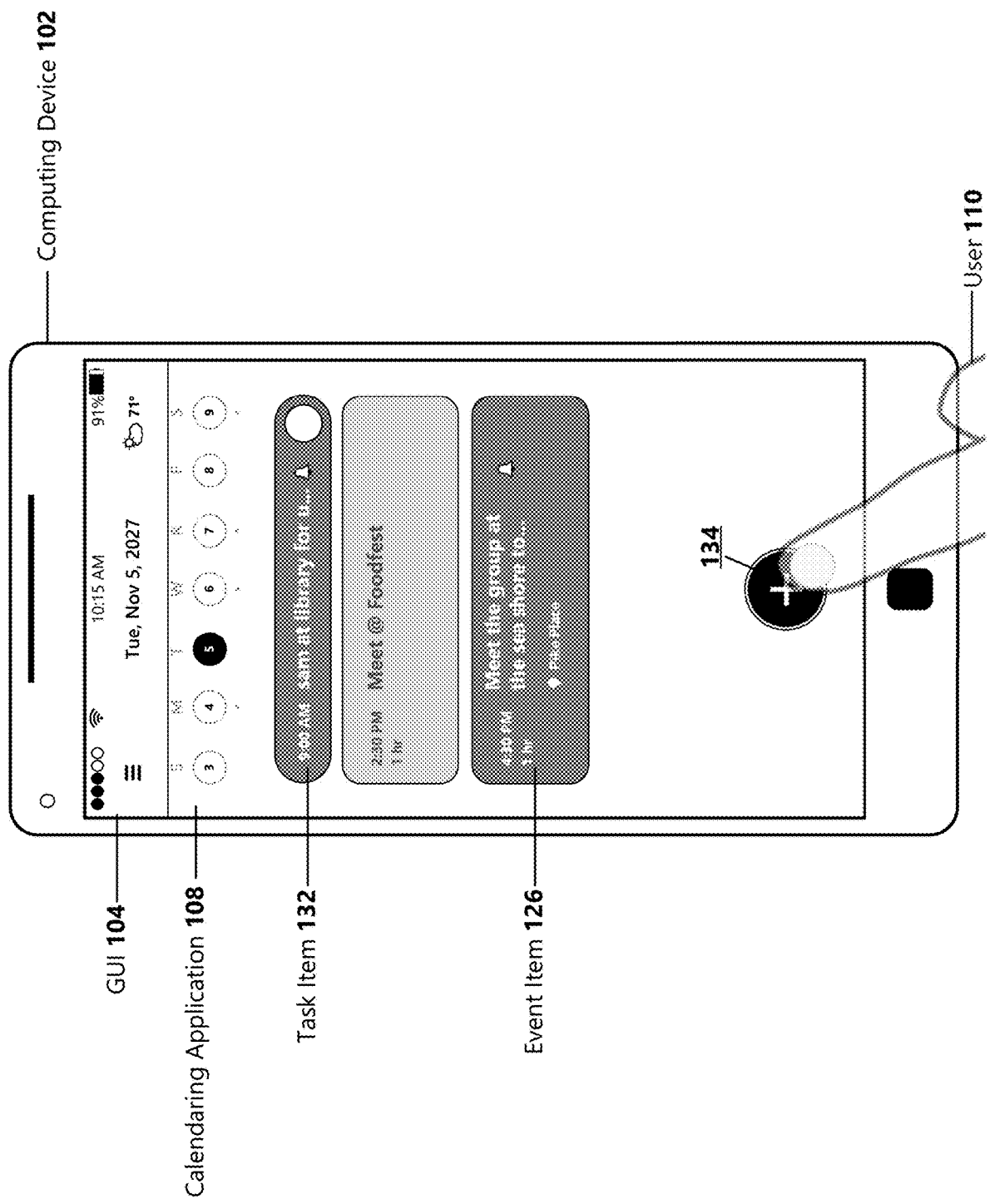
FIGS. 3A-3G illustrate a storyboard that shows another example use case utilizing aspects of the quick create system on a mobile computing device.

FIGS. 3A-3G are illustrations that show examples of various aspects of quick schedule item creation in a schedule on a mobile computing device 102. With reference now to FIG. 3A, the example application 108 is embodied as a calendaring application or an application that has calendar functionalities, wherein a plurality of schedule items (e.g., event items 126 or task items 132) are listed displayed along a first axis 202. In the illustrated example, the schedule items are listed displayed vertically down the screen along a Y axis, and a create option 134 is displayed in the GUI 104. As illustrated, the user 110 selects the create option 134 by tapping or long-pressing the create option. As should be appreciated, other selection methods are possible and are within the scope of the present disclosure.

Figure 3B:
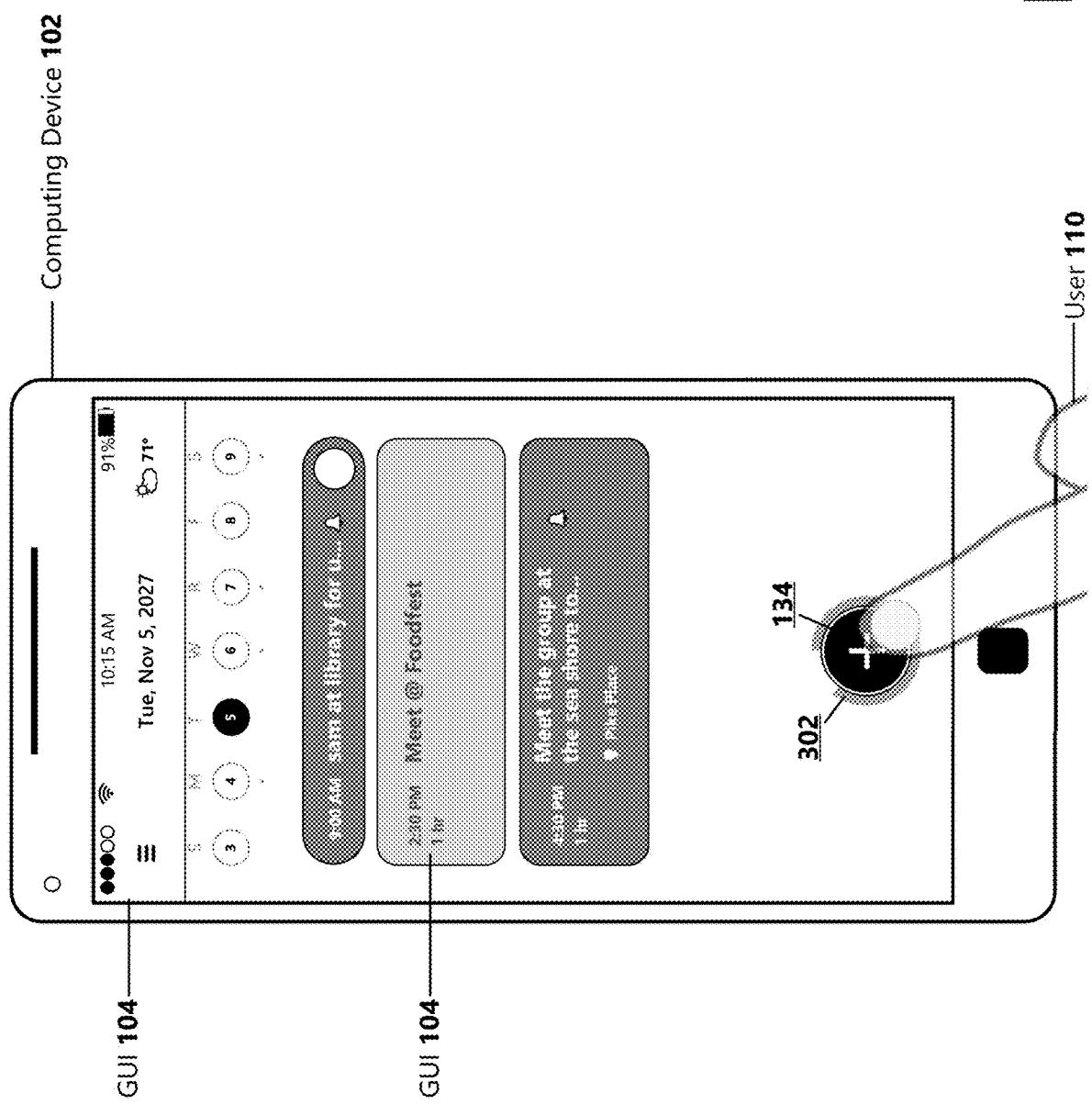

With reference now to FIG. 3B and according to one aspect, when the user 110 long-presses the create option 134, a visual indication 302 of a progress appears around the create option to inform the user of an action taking place that is different to a standard create function. For example, if the user 110 were to tap the create option 134, a form may open to allow the user to create a schedule item via previously known methods. However, a long-press selection input triggers the quick create system 116, and the visual indication 302 hints to the user of another feature (i.e., the quick create feature) that is launching.

Figure 3C:
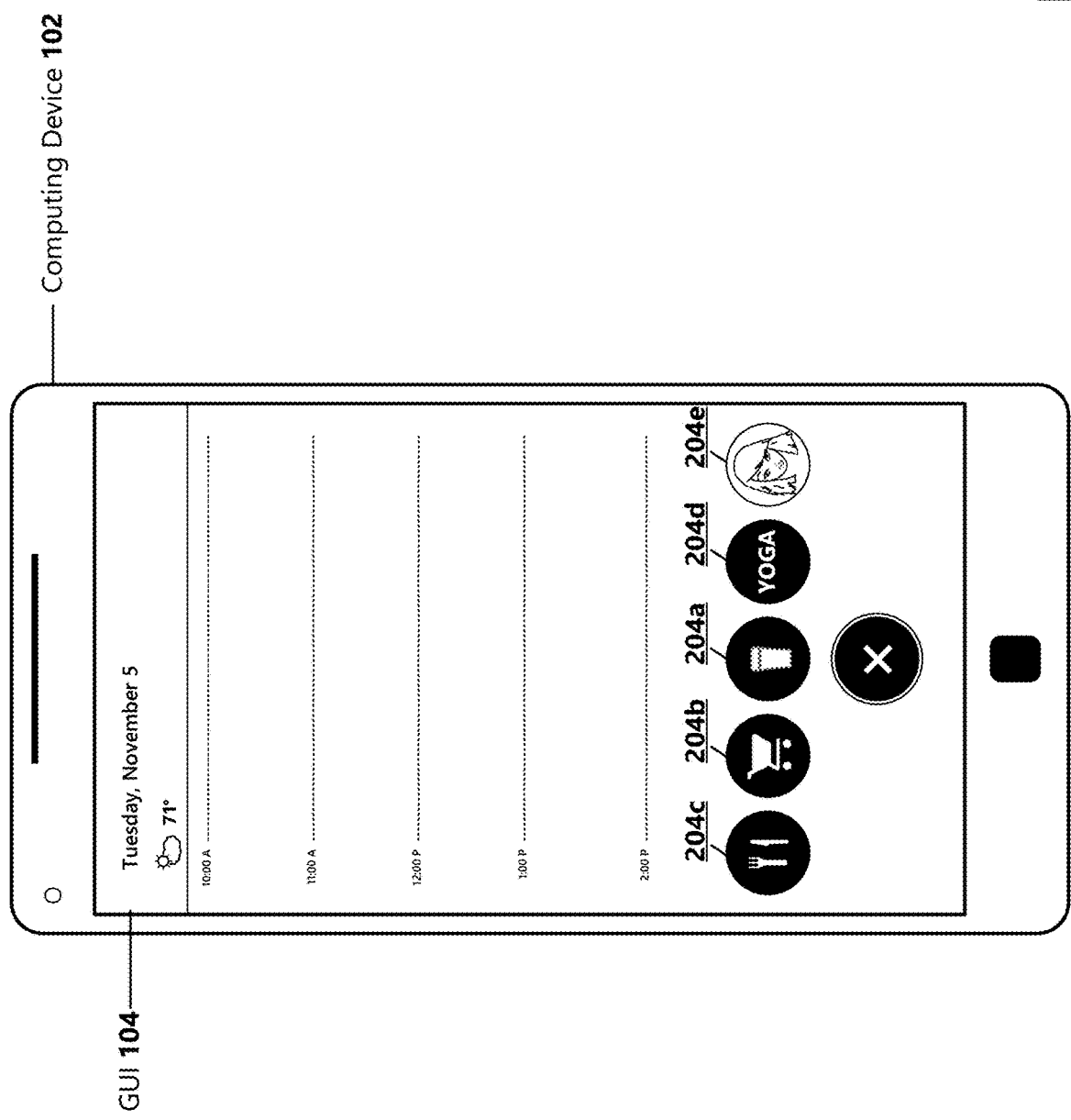

In some examples and with reference now to FIG. 3C, responsive to the selection of the create option 134 and once the launching of the quick create feature has completed, a plurality of icons 204a-e designating a plurality of schedule item types are displayed in the GUI 104. In some examples, the plurality of icons 204a-e are presented or arranged based on relevancy to the user 110, wherein a schedule item type's relevancy is based on frequency of use, recency of use, user-settings, or context (e.g., time-based or location-based). As illustrated and as described above, each icon 204 may comprise text, an image, an animated image, avatar, photo, or other graphical representation that portrays a meaning associated with the corresponding schedule item type to the user 110.

Figure 3D:
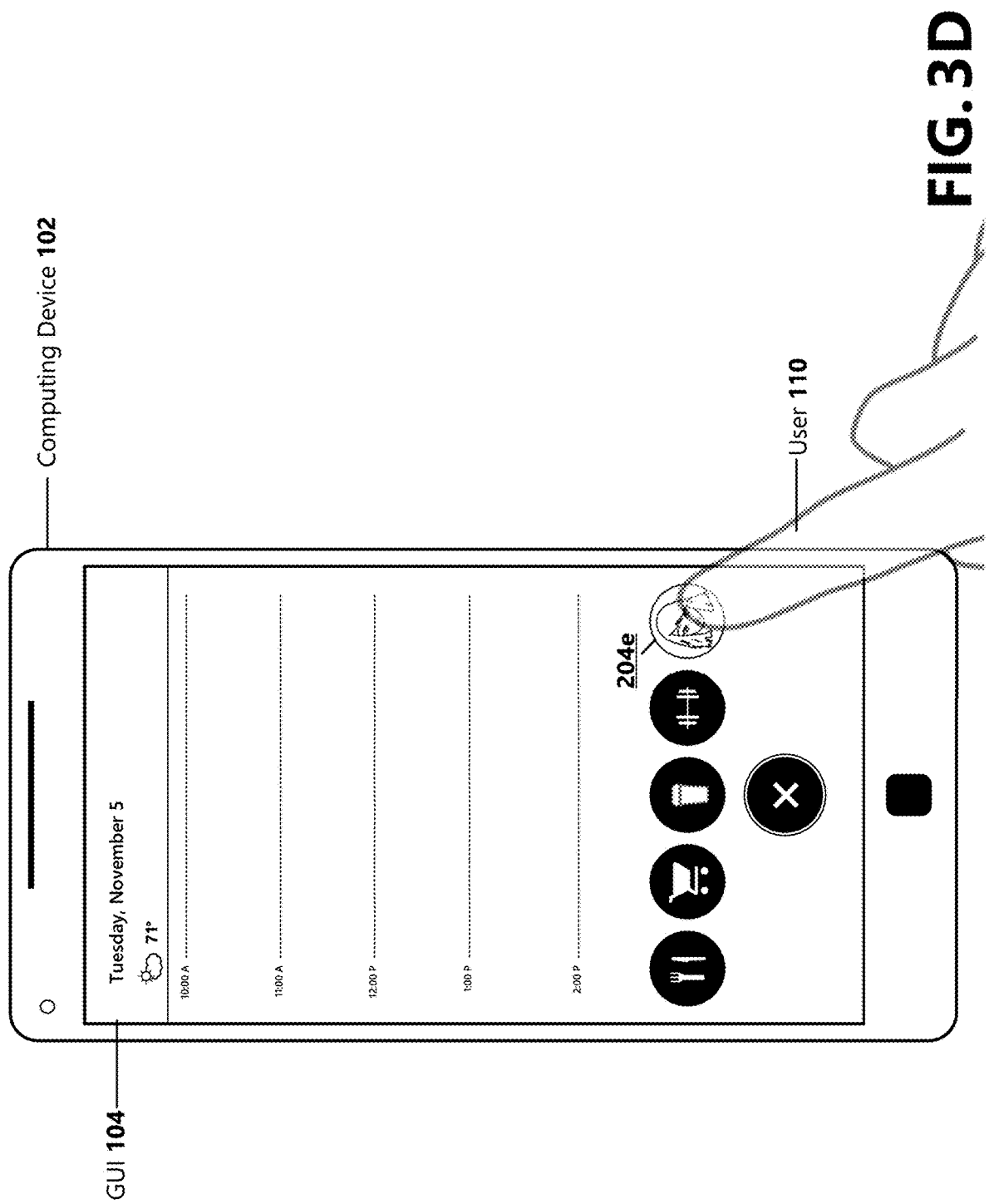
Figure 3E:
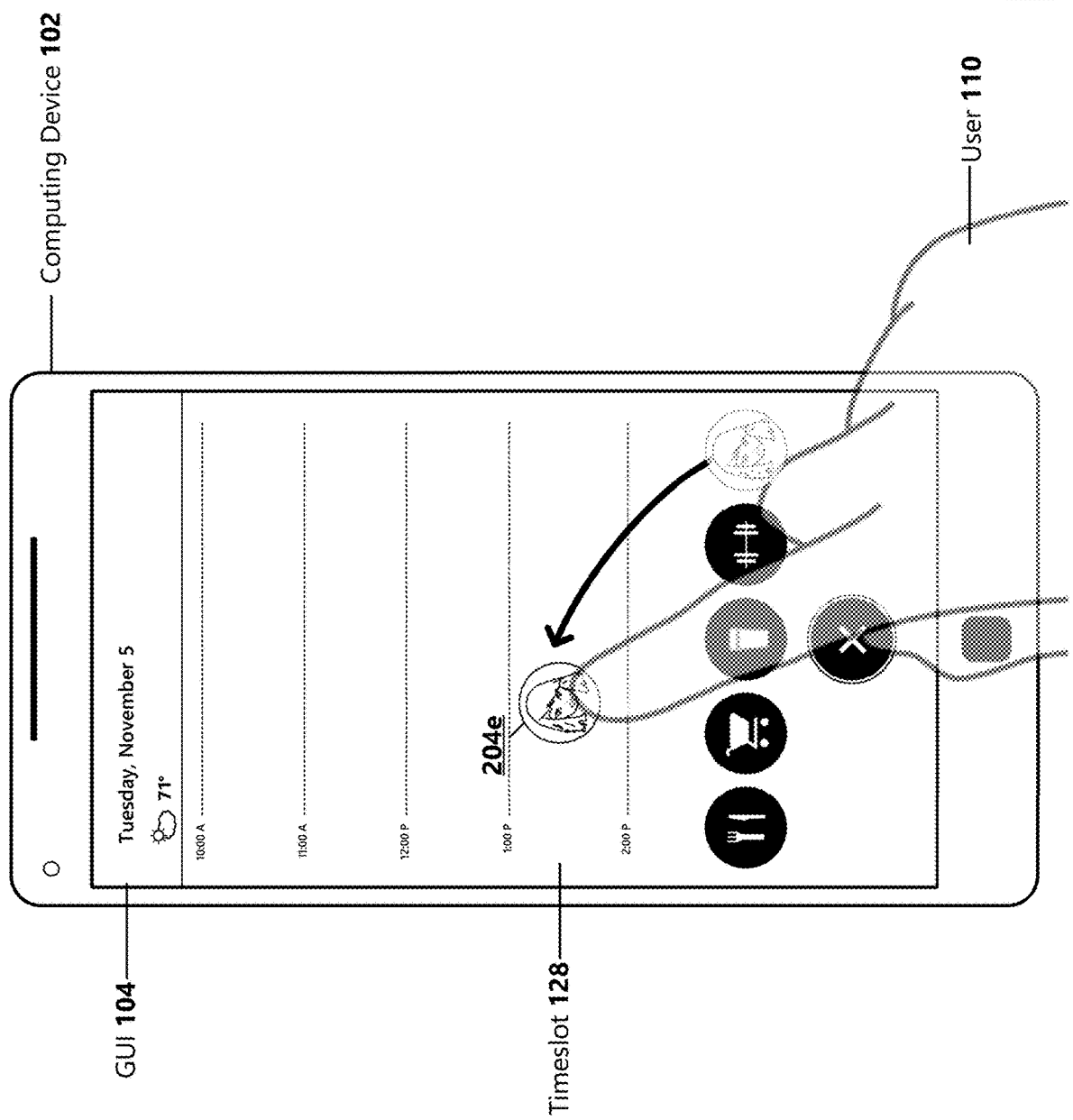

According to an aspect and as illustrated in FIG. 3D, the user 110 is enabled to select a schedule item icon 204 from the plurality of displayed icons 204a-e and move or drag the selected icon to a desired timeslot 128 in the calendar 124 or to a desired position in a task list 130. As illustrated in FIG. 3E, the user 110 selects and moves an icon 204e comprising a photo or image of a person to a particular timeslot 128. For example, the icon 204e may correspond to a schedule item type associated with the person in the photo or image.

Figure 3F:
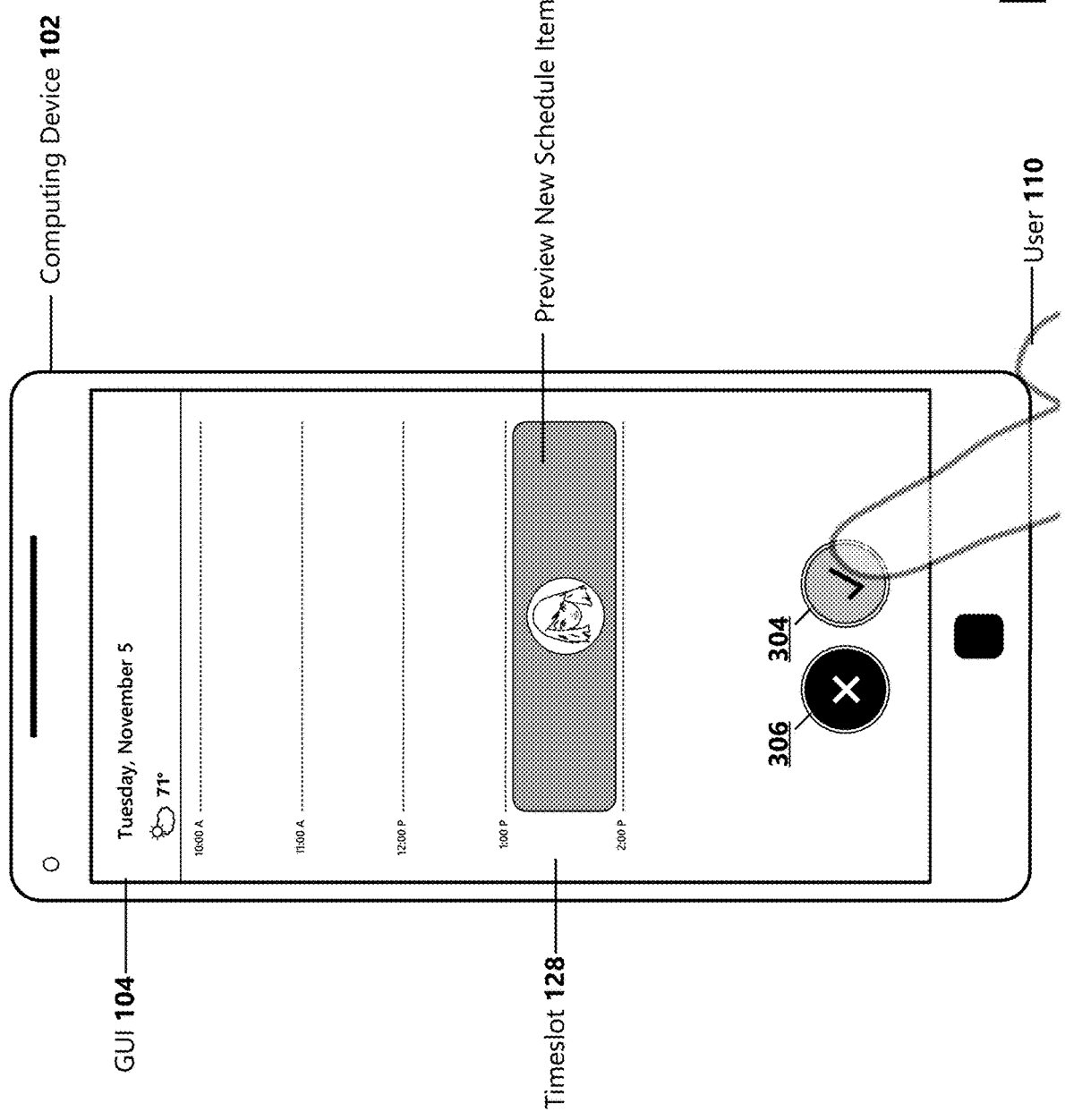

In some examples, when the user 110 releases the icon 204e, the release of the icon is determined to be a committal input, and a new schedule item 210 is inserted in the desired timeslot 128. In other examples and with reference now to FIG. 3F, responsive to releasing the icon 204e, a preview new schedule item 208 is shown in the timeslot 128, and a commit button 304 is provided in the GUI 104. Further, a cancel button 306 may also be provided. As illustrated in FIG. 3F, the user 110 selects the commit button 304, which is identified by the quick create system 116 as a committal input.

Figure 3G:
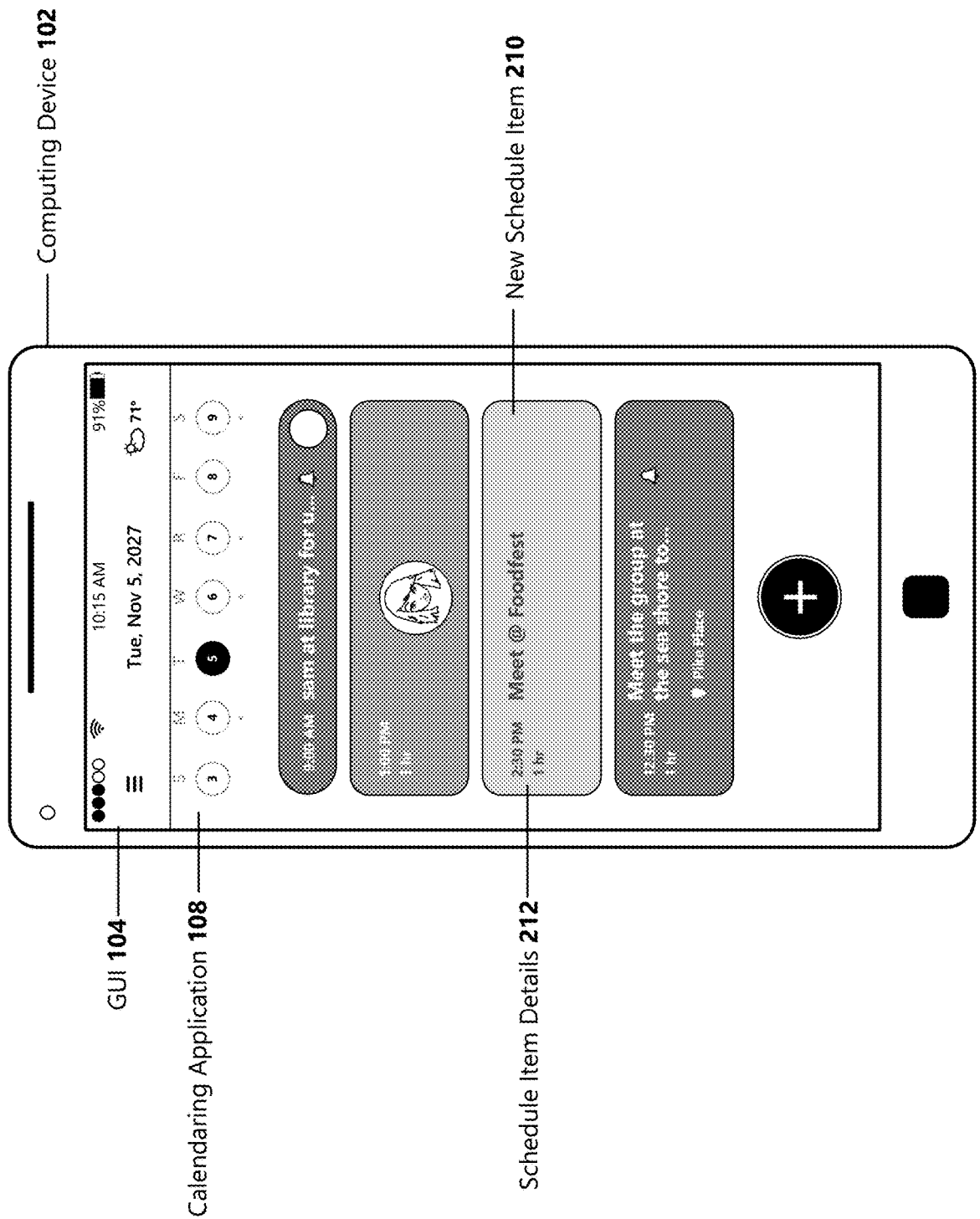

According to an aspect and with reference now to FIG. 3G, when the committal input is made by the user 110, the preview new schedule item 208 is converted into a new schedule item that is added to the user's schedule (e.g., calendar 124 or task list 130). Accordingly, schedule item details 212 associated with the schedule item type corresponding to the selected icon 204e are automatically applied to the new schedule item 210, wherein the schedule item details may be pre-entered by the user 110 in association with the schedule item type, or may be automatically filled in based on schedule details in other schedule items in the user's calendar 124. As can be appreciated, the new schedule item is efficiently created and added to the user's calendar 124 with a minimal number of steps and inputs by the user 110.

Figure 4A:
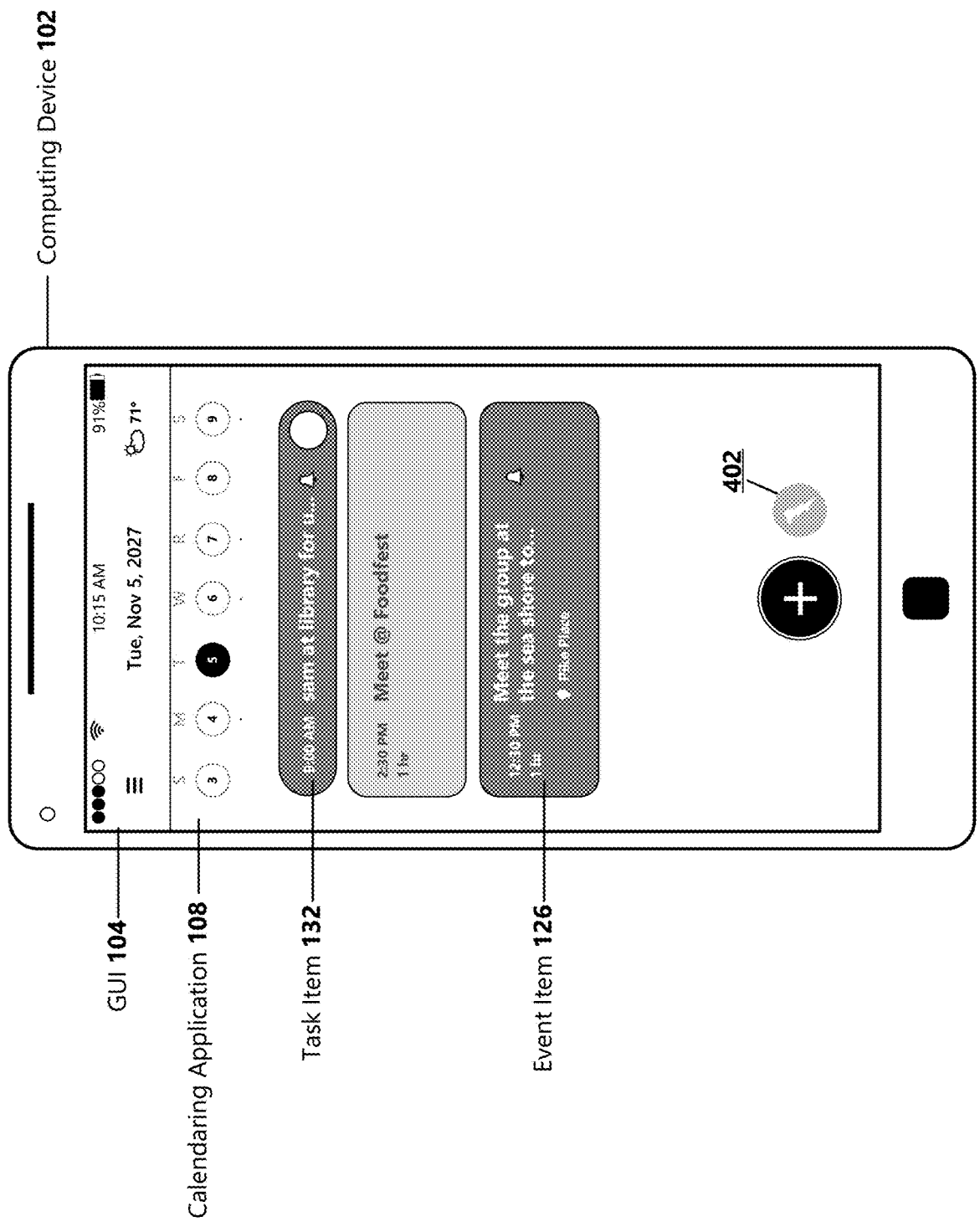

FIGS. 4A-4C illustrate an example of another selection method of the create option using a mobile computing device 102. With reference now to FIG. 4A, an example application 108 is embodied as a calendaring application or an application that has calendar functionalities. In this example, a quick create option 402 embodied as a button is provided; however, a create option functionality is also provided that is actuable via a gesture. As illustrated in FIG. 4B, the user 110 shakes the computing device 102. For example, the computing device 102 may comprise an accelerometer operative to register the shaking as a selection of the create option. Responsive to the gesture (i.e., shaking the computing device 102) and with reference now to FIG. 4C, the quick create system is triggered and a plurality of icons 204*a-e* designating a plurality of schedule item types are displayed in the GUI 104.

Figure 5A:
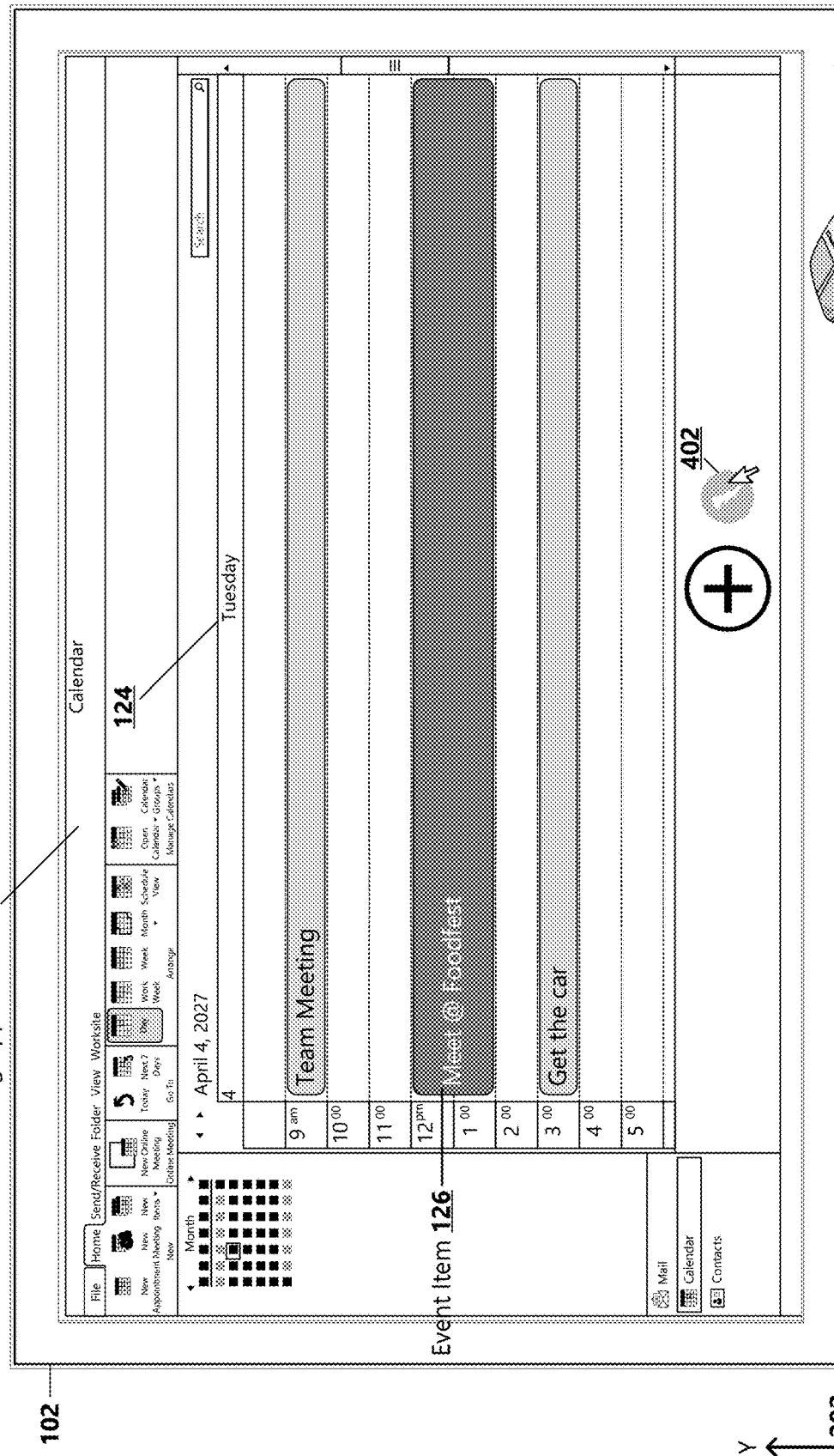

FIGS. 5A-5F are illustrations that show examples of various aspects of quick schedule item creation in a schedule on a desktop computing device 102. With reference now to FIG. 5A, the example application 108 is embodied as a calendaring application or an application that has calendar functionalities, wherein a plurality of schedule items (e.g., event items 126 or task items 132) are listed displayed along a first axis 202. In the illustrated example, the schedule items are listed displayed vertically down the screen along a Y axis, and a create option 134 and a quick create option 402 are displayed in the GUI 104. As illustrated, the user 110 selects the quick create option 402 by clicking on the quick create option via using a mouse as an input device 106. As should be appreciated, other selection methods and other input device types are possible and are within the scope of the present disclosure.

Figure 5B:
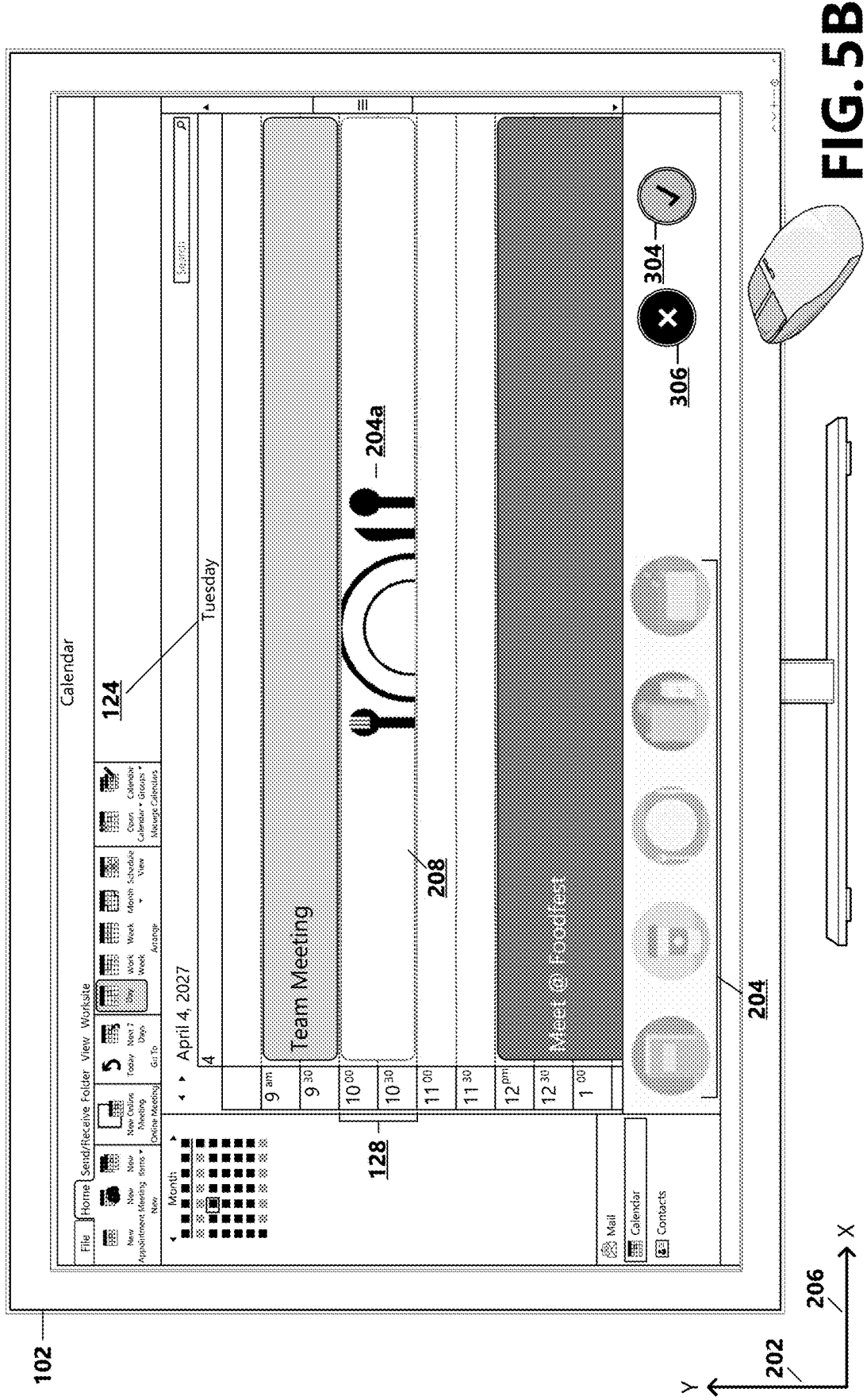

With reference now to FIG. 5B, upon selection of the quick create option 402, the GUI 104 is updated such that a first available or default timeslot 128 in the user's calendar 124 or task list 130 is displayed. In one example and as illustrated, an icon 204*a* designating a first schedule item type and a preview new schedule item 208 is shown in the timeslot 128. For example and as illustrated, the icon 204*a* can be a graphical representation that fills all or a portion of a particular timeslot 128. Further, a commit button 304 and a cancel button 306 may be provided in the GUI 104. In some examples, a plurality of selectable icons 204 designating other schedule item types are displayed in the GUI 104. According to an aspect and with reference now to FIG. 5C, the schedule item type icon 204*a* can be moved into another timeslot 128 or into another position in a task list 130. For example, the user 110 drags the icon 204*a*, and correspondingly the preview new schedule item 208, vertically or along the first axis 202 to a desired timeslot 128 in the calendar 124.

Figure 5D:
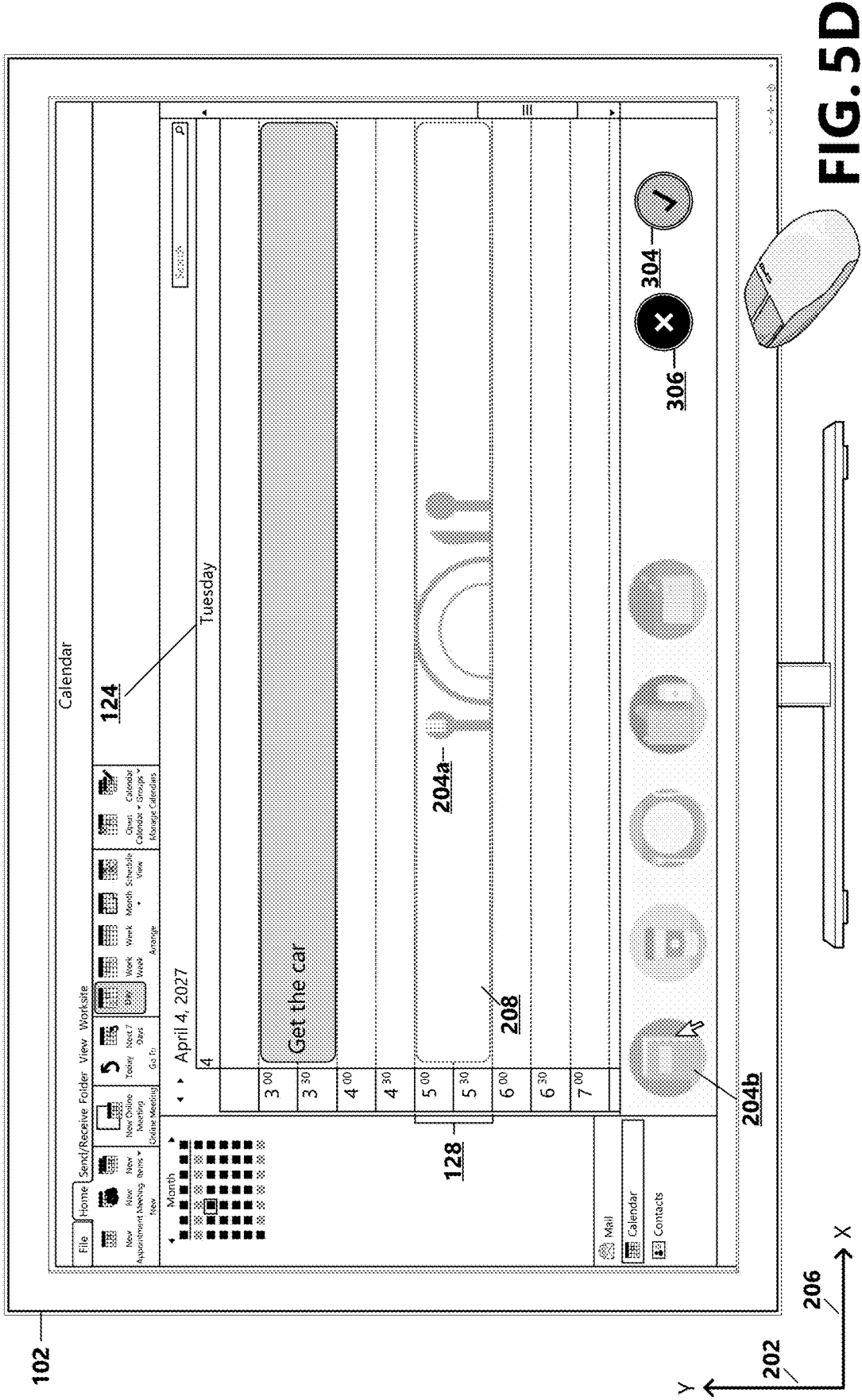

According to an aspect and with reference now to FIG. 5D, the user 110 is enabled to select another icon of the plurality of icons 204 designating other schedule item types displayed in the GUI 104 to transform the icon displayed in the preview new schedule item 208 to a schedule item of another type. For example and as illustrated in FIG. 2D, the user 110 selects a second icon 204*b* designating a study schedule item type. As should be appreciated, in other examples, the toggling between other schedule item types can be achieved by laterally dragging the icon displayed in the timeslot 128.

Figure 5E:
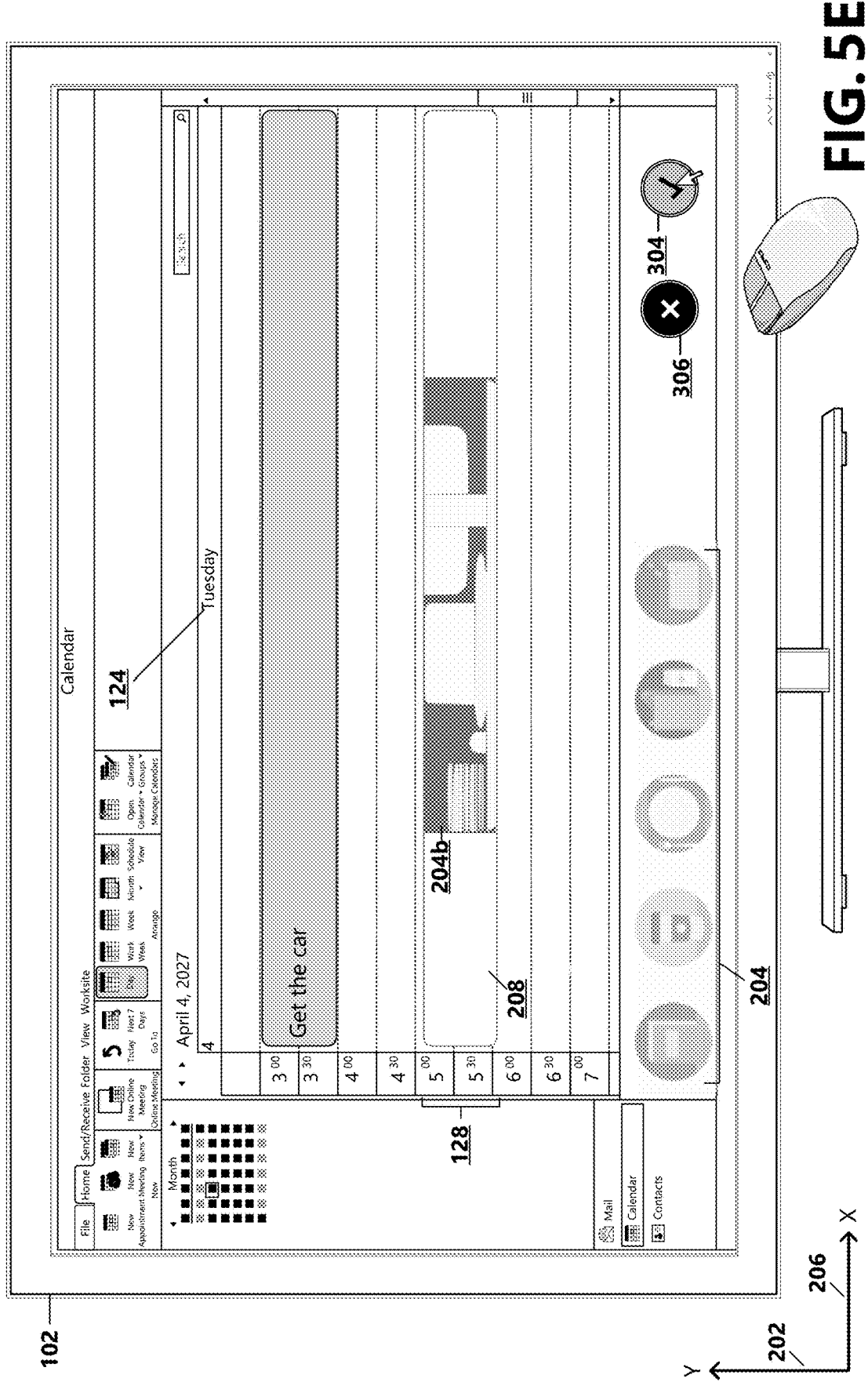

With reference now to FIG. 5E, responsive to the selection of the second icon 204*b* designating the study schedule item type, the icon displayed in the preview new schedule item 208 is updated to the icon 204*b* designating the selected schedule item type. In the illustrated example, the icon 204*b* designating the second schedule item type is a graphical representation of a computer desk designating a "study" schedule item type. Further, the user 110 selects the commit button 304, which is identified by the quick create system 116 as a committal input.

Figure 5F:
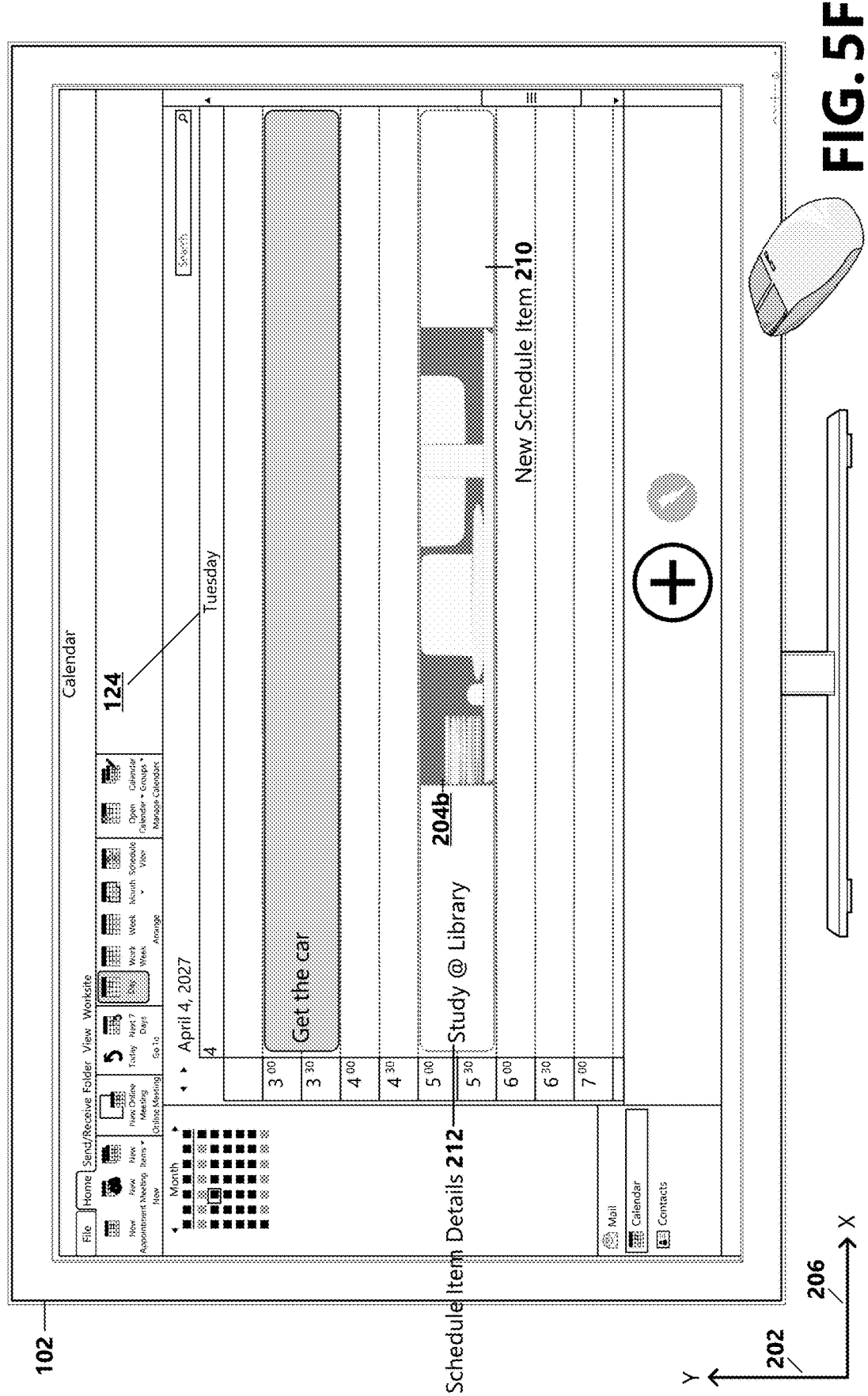

Accordingly and with reference now to FIG. 5F, when the committal input is made by the user 110, the preview new schedule item 208 is converted into a new schedule item that is added to the user's schedule (e.g., calendar 124 or task list 130), and schedule item details 212 associated with the schedule item type corresponding to the selected icon 204*b* are automatically applied to the new schedule item 210. As described above, the schedule item details 212 may be pre-entered by the user 110 in association with the schedule item type, or may be automatically filled in based on schedule details in other schedule items in the user's calendar 124. As can be appreciated, the new schedule item is efficiently created and added to the user's calendar 124 with a minimal number of steps and inputs by the user 110.

Figure 6:
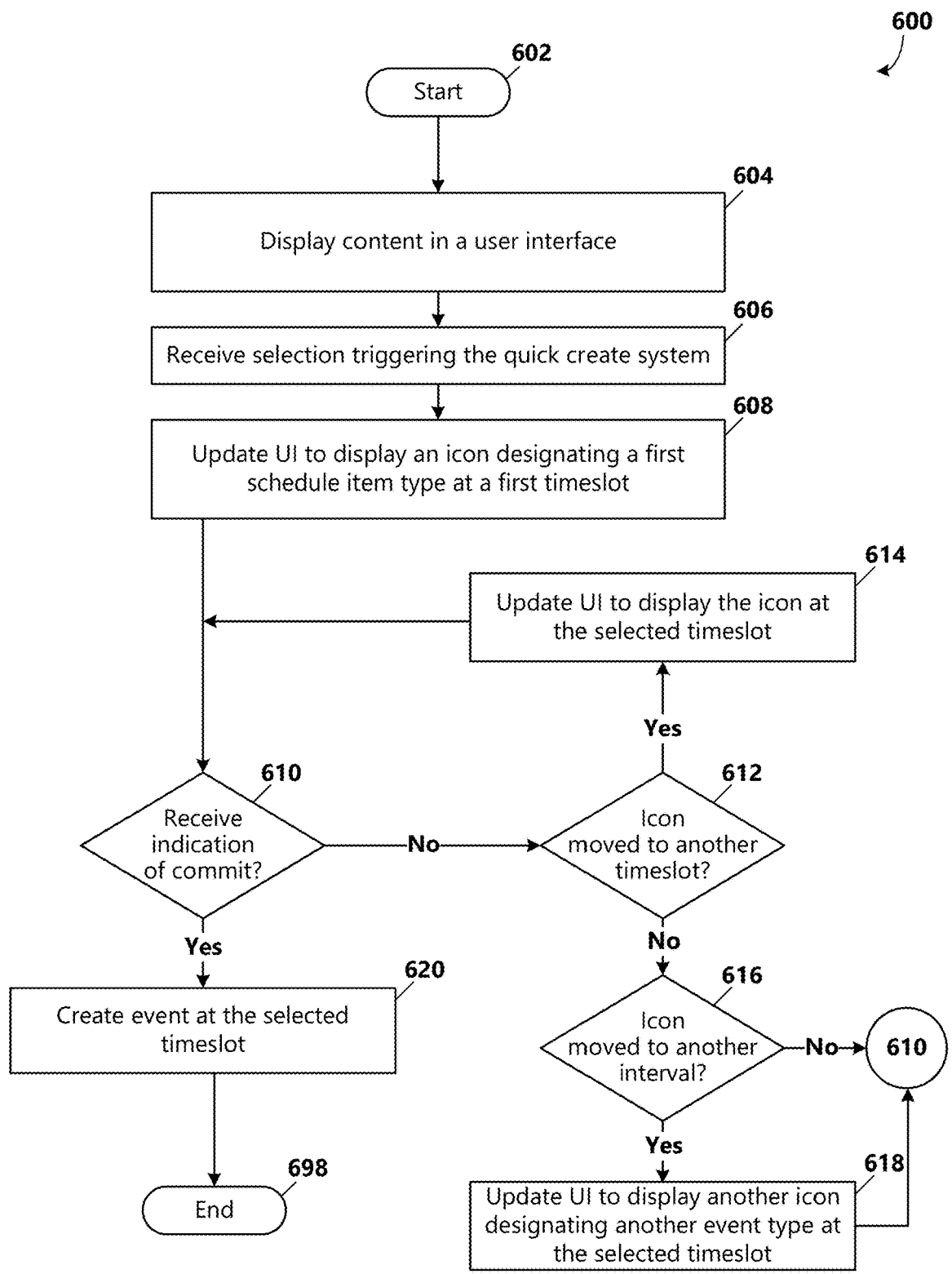
FIG. 6 is a flow chart showing general stages involved in an example method for efficient creation of a new schedule item.

FIG. 6 is a flow chart showing general stages involved in one example method 600 for quick schedule item creation. The method 600 starts at OPERATION 602, and proceeds to OPERATION 604, where content is displayed in a GUI 104. For example, content 112 displayed in the GUI 104 of an electronic calendar application may include a calendar 124 comprised of timeslots 128 and event items 126 or task items 132 scheduled within selected timeslots. As another example, content 112 displayed in the GUI 104 of a task list application may include a task list 130 comprised of task items 132 or to-do list items that may or may not be temporally ordered. Further, in some examples, a create option 134 is provided for allowing the user 110 to create a new schedule item, such as an event item in a calendar 124 or a task item 132 in a to-do or task list 130.

The method 600 proceeds to OPERATION 606, where selection input for triggering the quick create system 116 is received. In some examples, the selection input comprises long-pressing the create option 134. In other examples, the selection input comprises shaking the (mobile) computing device 102. In other examples, the selection input comprises clicking on a quick create option 402. In other examples, the selection input comprises long-pressing on an empty timeslot 128. As should be appreciated, other selection input methods for triggering the quick create system 116 are possible and are within the scope of the present disclosure.

The method 600 continues to OPERATION 608, where the GUI 104 is updated to display an icon 204*a* designating a first schedule item type. In some examples, the first schedule item type is presented first as a suggested most-relevant schedule item type, wherein a schedule item type's relevancy is based on frequency of use, recency of use, user-settings, or context (e.g., time-based or location-based). In some examples, the schedule (e.g., calendar 124, task list 130) is scrolled to a position where the first available or default timeslot 128 in the currently selected day is displayed near the user-controlled cursor (e.g., a mouse cursor, a touch-point on a touch-screen interface, a focus-point on a motion gesture detection device, or head, eye, or gaze tracking device). Further, in some examples, a preview new schedule item 208 is shown in the timeslot 128. The preview new schedule item 208 shows the user 110 where a new schedule item will be inserted upon receiving a committal input (e.g., releasing the icon 204, selecting a commit button, providing a commit command).

The method 600 proceeds to DECISION OPERATION 610, where a determination is made as to whether a committal input is received. When a determination is made that a committal input is received, the method 600 continues to OPERATION 620, where a new schedule item 210 is created and added to the user's schedule at the selected (1$^{st}$ available or default) timeslot. In some examples, the new schedule item 210 is populated with schedule item details 212 associated with the selected schedule item type represented by the icon 204 that was displayed in the GUI 104 when the committal input was received. The schedule item details may be pre-entered by the user 110 in association with the schedule item type, or may be automatically filled in based on schedule details in other schedule items in the user's calendar 124.

When a determination is made that a committal input is not received at DECISION OPERATION 610, the method 600 proceeds to DECISION OPERATION 612, where a determination is made as to whether the icon 204 has been moved to another timeslot 128 in the user's schedule. When a determination is made that the icon 204 has been moved to another timeslot 128, the method 600 continues to OPERATION 614, where the GUI 104 is updated to display the icon 204, and correspondingly the preview new schedule item 208, at the new timeslot. The method 600 then returns to DECISION OPERATION 610.

When a determination is made that the icon 204 has not been moved to another timeslot 128 in the user's schedule at DECISION OPERATION 612, the method 600 proceeds to DECISION OPERATION 616, where a determination is made as to whether the icon 204 has been moved to another interval along the second axis 206 (e.g., the axis perpendicular to the listing of schedule items or timeslots 128 in the schedule). For example a positive determination may be made when the user 110 drags the icon 204a along the second axis 206 to toggle between other schedule item types. When a positive determination is made, the method 600 continues to OPERATION 618, where the GUI 104 is updated to display another icon designating the schedule item type corresponding to the interval in which the icon has been moved. The method 600 then returns to DECISION OPERATION 610. When a determination is made that the icon 204 has not been moved to another interval along the second axis 206 at DECISION OPERATION 616, the method 600 returns to DECISION OPERATION 610.

After a committal input is received and a new schedule item 210 is efficiently created and added to the user's schedule at OPERATION 620, the method 600 ends at OPERATION 698.

Figure 7:
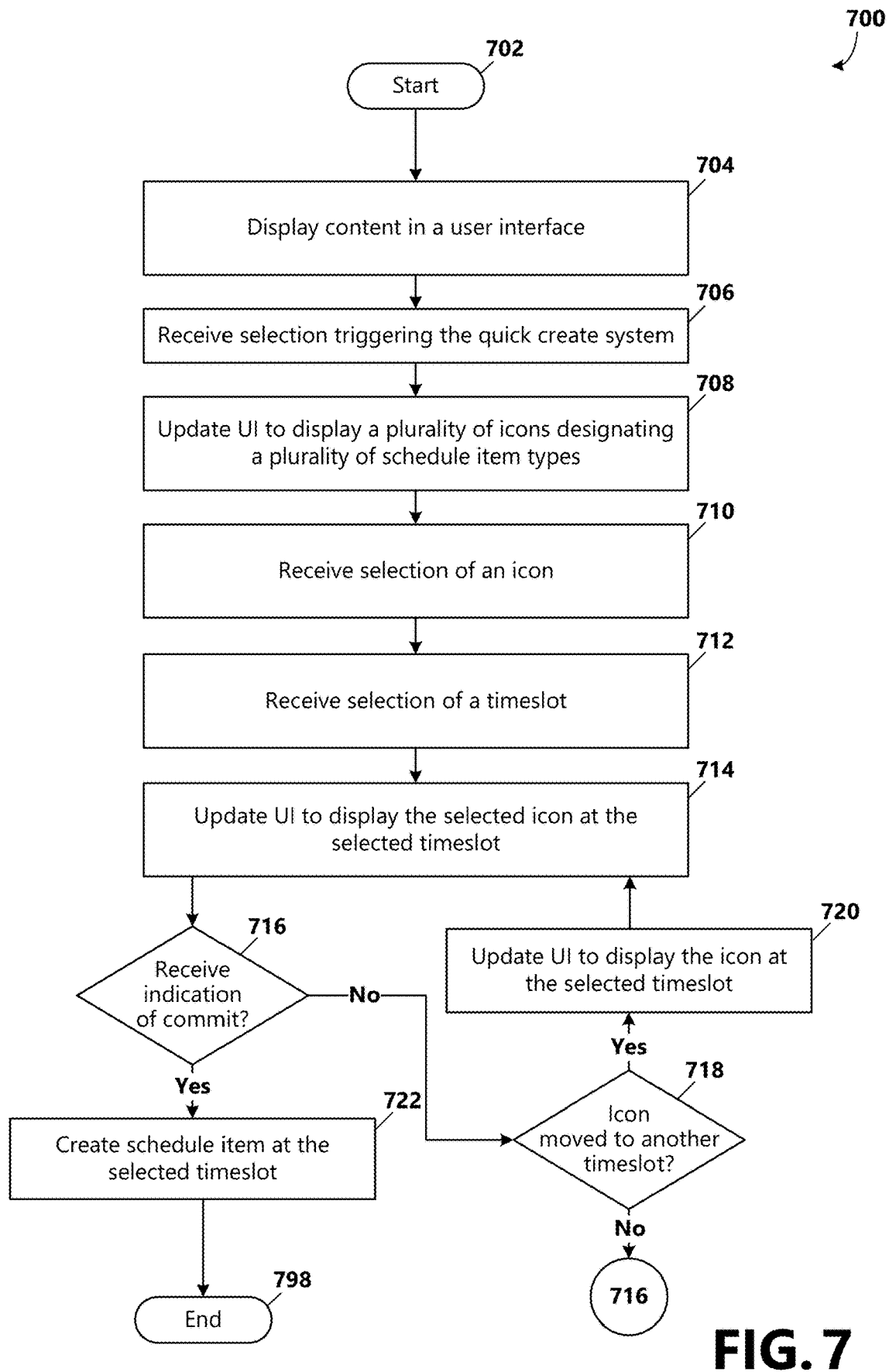
FIG. 7 is a flow chart showing general stages involved in another example method for efficient creation of a new schedule item

FIG. 7 is a flow chart showing general stages involved in another example method 700 for quick schedule item creation. The method 700 starts at OPERATION 702, and proceeds to OPERATION 704, where content is displayed in a GUI 104. For example, content 112 displayed in the GUI 104 of an electronic calendar application may include a calendar 124 comprised of timeslots 128 and event items 126 or task items 132 scheduled within selected timeslots. As another example, content 112 displayed in the GUI 104 of a task list application may include a task list 130 comprised of task items 132 or to-do list items that may or may not be temporally ordered. Further, in some examples, a create option 134 is provided for allowing the user 110 to create a new schedule item, such as an event item in a calendar 124 or a task item 132 in a to-do or task list 130.

The method 700 proceeds to OPERATION 706, where selection input for triggering the quick create system 116 is received. In some examples, the selection input comprises long-pressing the create option 134. In other examples, the selection input comprises shaking the (mobile) computing device 102. In other examples, the selection input comprises clicking on a create option 134. As should be appreciated, other selection input methods for triggering the quick create system 116 are possible and are within the scope of the present disclosure.

The method 700 continues to OPERATION 708, where the GUI 104 is updated to display a plurality of icons 204 designating a plurality of schedule item types. In some examples, the plurality of icons 204 are presented or arranged based on relevancy to the user 110, wherein a schedule item type's relevancy is based on frequency of use, recency of use, user-settings, or context (e.g., time-based or location-based).

The method 700 proceeds to OPERATION 710, where the user 110 selects a schedule item icon 204 from the plurality of displayed icons, and at OPERATION 712, the user selectively moves or drags the selected icon to a desired timeslot 128 in the calendar 124 or to a desired position in a task list 130.

At OPERATION 714, the GUI 104 is updated to display the selected icon 204 and a preview new schedule item 208 in the selected timeslot 128. The method 700 proceeds to DECISION OPERATION 716, where a determination is made as to whether a committal input (e.g., releasing the icon 204, selecting a commit button, providing a commit command) is received. When a determination is made that a committal input is received, the method 700 continues to OPERATION 722, where a new schedule item 210 is created and added to the user's schedule at the selected timeslot 128. In some examples, the new schedule item 210 is populated with schedule item details 212 associated with the selected schedule item type represented by the selected icon 204. The schedule item details may be pre-entered by the user 110 in association with the schedule item type, or may be automatically filled in based on schedule details in other schedule items in the user's calendar 124.

When a determination is made that a committal input is not received at DECISION OPERATION 716, the method 700 proceeds to DECISION OPERATION 718, where a determination is made as to whether the icon 204 has been moved to another timeslot 128 in the user's schedule. When a determination is made that the icon 204 has been moved to another timeslot 128, the method 700 continues to OPERATION 720, where the GUI 104 is updated to display the icon 204, and correspondingly the preview new schedule item 208, at the new timeslot. The method 700 then returns to OPERATION 714.

When a determination is made that the icon 204 has not been moved to another timeslot 128 in the user's schedule at DECISION OPERATION 718, the method 700 returns to DECISION OPERATION 716. After a committal input is received and a new schedule item 210 is efficiently created and added to the user's schedule at OPERATION 722, the method 700 ends at OPERATION 798.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
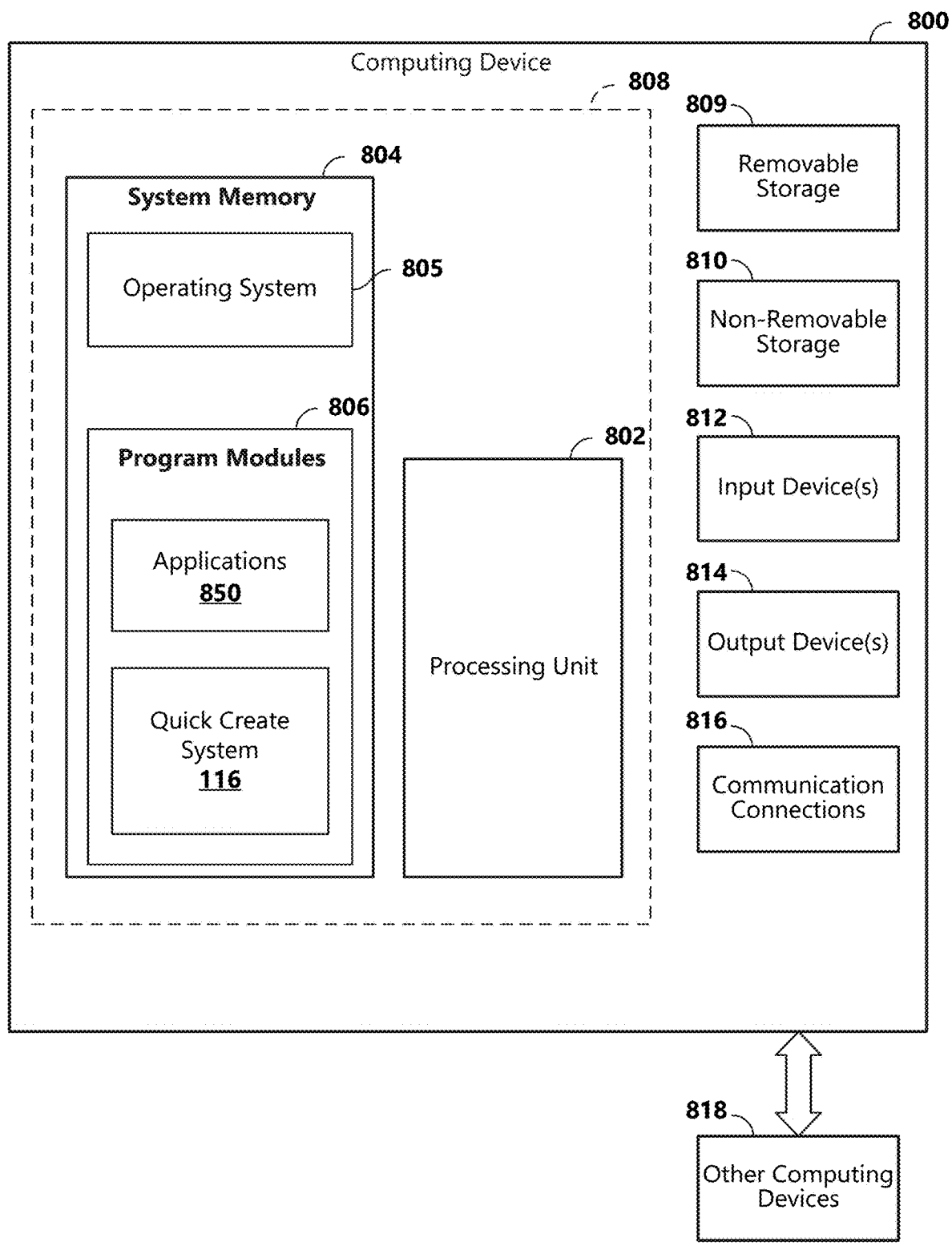
FIG. 8 is a block diagram illustrating example physical components of a computing device.
Figure 9A:
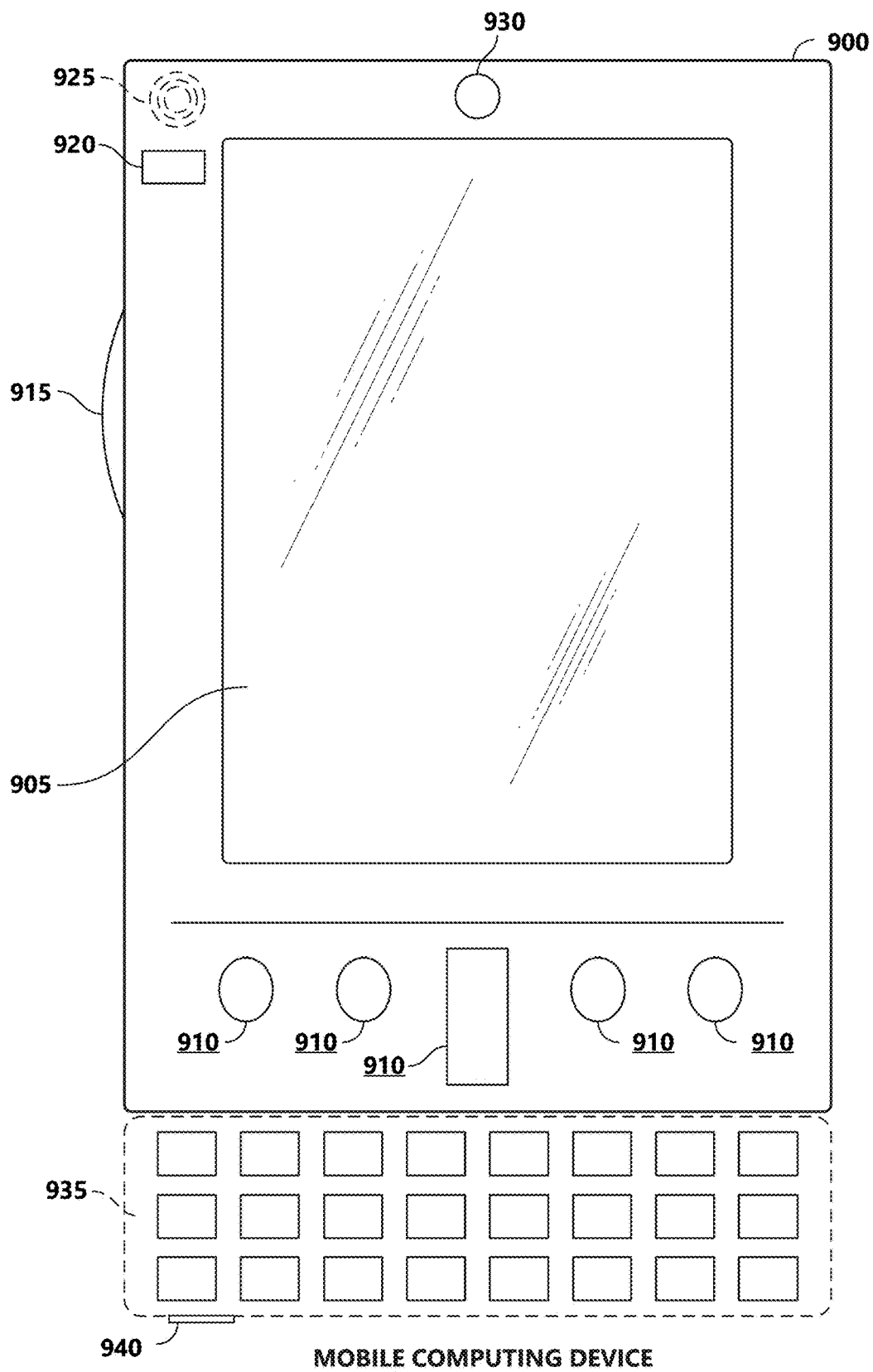
FIGS. 9A and 9B are block diagrams of a mobile computing device.
Figure 9B:
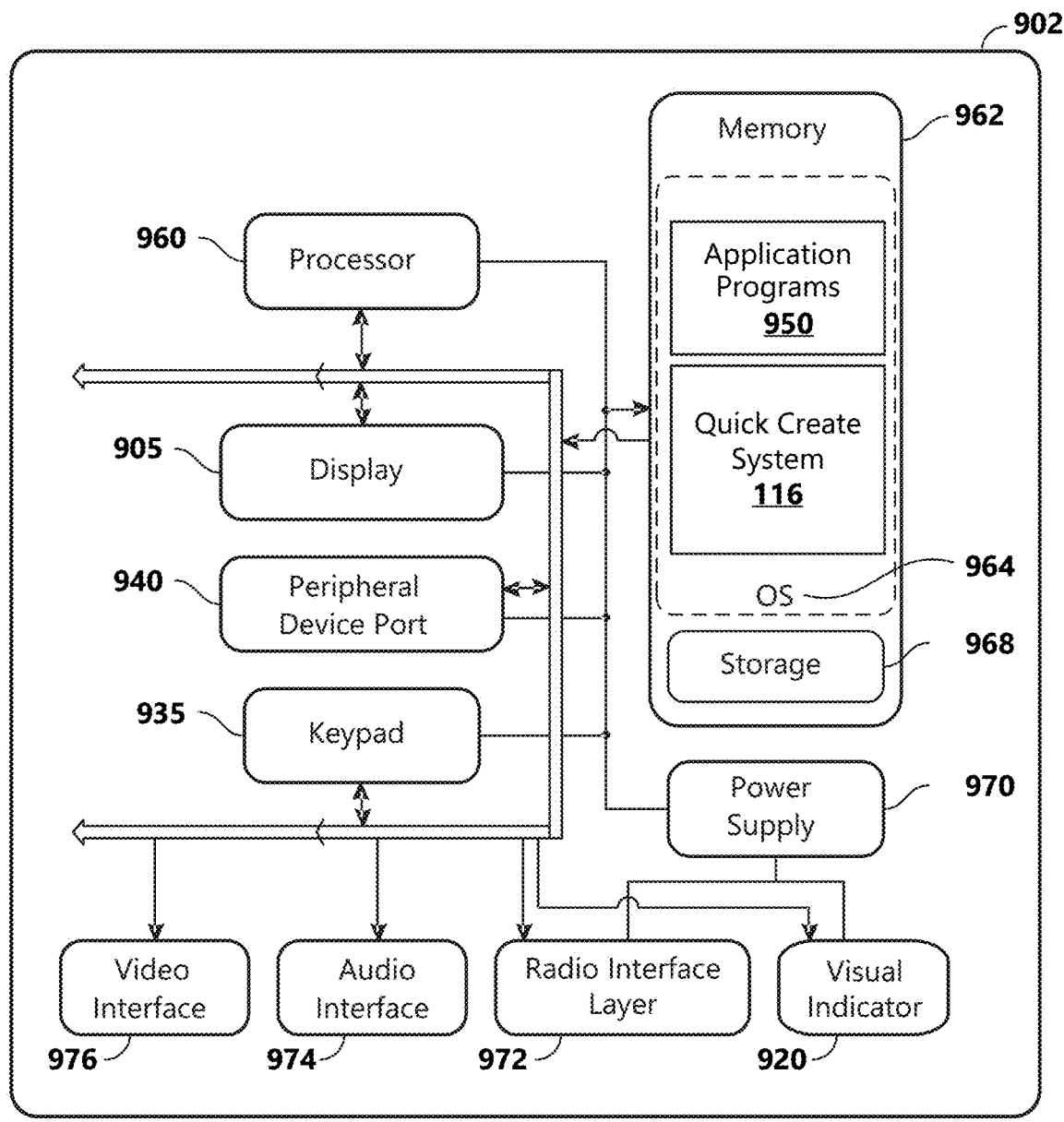
Figure 10:
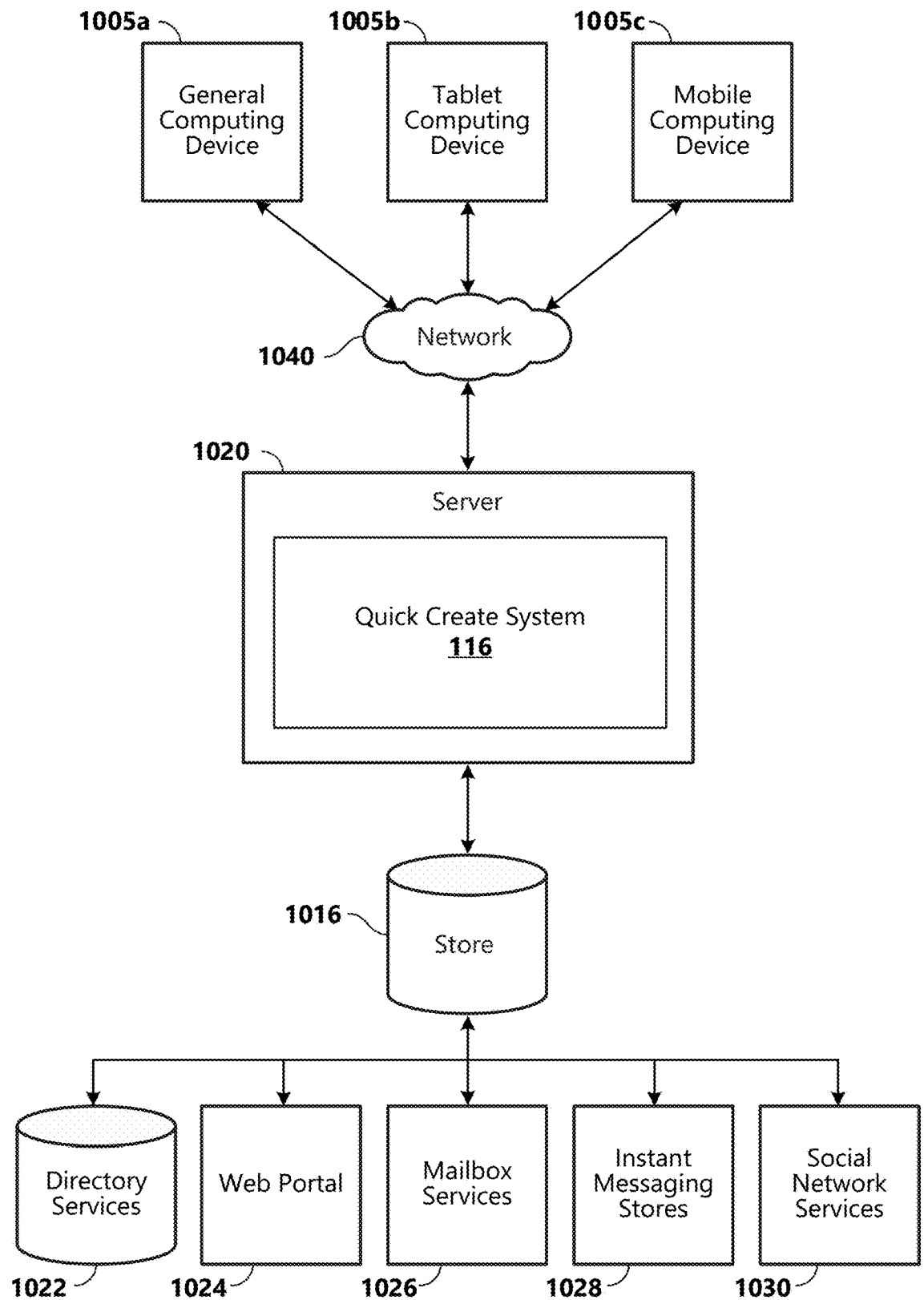
FIG. 10 is a block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are utilized for practicing aspects, described herein.

FIG. 8 is a block diagram illustrating physical components (i.e., hardware) of a computing device 800 with which examples of the present disclosure may be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes the quick create system 116. The operating system 805, for example, is suitable for controlling the operation of the computing device 800. Furthermore, aspects are practiced in conjunction with a graphics library, other operating systems, or any other application program, and are not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., quick create system 116) perform processes including, but not limited to, one or more of the stages of the methods 600,700 illustrated in FIGS. 6 and 7. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the quick create system 116 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

FIG. 10 illustrates one example of the architecture of a system for efficiently creating a new schedule item as described above. Content developed, interacted with, or edited in association with the quick create system 116 is enabled to be stored in different communication channels or other storage types. For example, various documents may be stored using a directory service 1022, a web portal 1024, a mailbox service 1026, an instant messaging store 1028, or a social networking site 1030. The quick create system 116 is operative to use any of these types of systems or the like for efficiently creating a new schedule item, as described herein. According to an aspect, a server 1020 provides the quick create system 116 to clients 1005a,b,c. As one example, the server 1020 is a web server providing the quick create system 116 over the web. The server 1020 provides the quick create system 116 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operable to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computing device for creating a new schedule item, the computing device comprising:
 at least one processing device; and
 at least one computer readable data storage device storing instructions that, when executed by the at least one processing device, are operative to:
 display a schedule in a user interface;
 responsive to receiving a user input triggering quick item creation, update the user interface to display a first icon designating a first schedule item type at a first timeslot of a plurality of timeslots displayed along a first axis in the user interface;
 receive a selection of the first icon and an indication of movement of the first icon along a second axis;
 as the first icon is moved along the second axis, toggle between a plurality of other icons designating a plurality of other schedule item types at the first timeslot, the plurality of other icons including at least a second icon designating a second schedule item type;
 update the user interface to transform the first icon to each of the plurality of other icons at the first timeslot as the plurality of other icons are toggled between; and
 responsive to receiving an indication of a committal input associated with the second icon, create a schedule item of the second schedule item type within the schedule at the first timeslot.

2. The computing device of claim 1, wherein in creating the schedule item of the second schedule item type, the at least one processing device is operative to populate the schedule item with schedule details associated with the second schedule item type.

3. The computing device of claim 1, wherein:
 the second axis is segmented into a plurality of intervals, each interval associated with a particular schedule item type; and
 in receiving the indication of movement of the first icon designating the first schedule item type along the second axis, the at least one processing device is operative to receive an indication of movement of the first icon to an interval along the second axis, wherein the interval is associated with the second schedule item type.

4. The computing device of claim 3, wherein the schedule item types associated with each interval of the plurality of intervals are positioned along the second axis based on relevancy to a user of the schedule.

5. The computing device of claim 1, wherein the first timeslot comprises:
 a first-available timeslot in the schedule; or
 a default timeslot in the schedule.

6. The computing device of claim 5, wherein the at least one processing device is further operative to:
 scroll the schedule to the first-available timeslot in the schedule; or
 scroll the schedule to the default timeslot in the schedule.

7. The computing device of claim 1, wherein prior to updating the user interface to display the first icon designating the first schedule item type at the first timeslot, the at least one processing device is further operative to receive a selection of the first timeslot.

8. The computing device of claim 1, wherein in receiving the user input triggering quick item creation, the at least one processing device is operative to:
 display a create option in the user interface; and
 receive a selection of the create option.

9. The computing device of claim 8, wherein the selection is a long-press selection.

19

10. The computing device of claim 8, wherein in receiving the user input triggering quick item creation, the at least one processing device is operative to receive a drag input of the create option to the first timeslot.

11. The computing device of claim 1, wherein in receiving the user input triggering quick item creation, the at least one processing device is operative to:
  receive an indication of shaking of the computing device;
  receive an indication of a quick create option; or
  receive an indication of a long-press on an empty timeslot.

12. The computing device of claim 1, wherein in updating the user interface to display the first icon designating the first schedule item type at the first timeslot, the at least one processing device is further operative to display a preview new schedule item in the first timeslot.

13. The computing device of claim 1, wherein the committal input is one of:
  a release of the second icon;
  a selection of a commit button; and
  a commit command.

14. The computing device of claim 1, wherein prior to receiving the indication of the committal input, the at least one processing device is further operative to:
  receive an indication of movement of the second icon designating the schedule item of the second type to a second timeslot; and
  update the user interface to display the second icon designating the second schedule item type at the second timeslot.

15. The computing device of claim 14, wherein the at least one processing device is further operative to create a schedule item of the second schedule item type within the schedule at the second timeslot.

16. A computer-implemented method for creating a new schedule item, comprising:
  displaying a schedule comprising a plurality of timeslots along a first axis in a user interface;
  receiving a user input triggering quick item creation;
  updating the user interface to display a plurality of icons, each icon designating a particular schedule item type;
  receiving a selection of a first icon designating a first schedule item type;
  receiving an indication of movement of the first icon along the first axis to a first timeslot within the plurality of timeslots;
  displaying the first icon designating the first schedule item type at the first timeslot;
  receiving a selection of the first icon and an indication of movement of the first icon along a second axis;
  as the first icon is moved along the second axis, toggling between a plurality of other icons designating a plurality of other schedule item types at the first timeslot, the plurality of other icons including at least a second icon designating a second schedule item type;
  updating the user interface to transform the first icon to each of the plurality of other icons at the first timeslot as the plurality of other icons are toggled between;
  receiving an indication of a committal input associated with the second icon; and
  creating a schedule item of the second schedule item type within the schedule at the first timeslot.

17. The computer-implemented method of claim 16, wherein creating the schedule item of the second schedule item type comprises populating the schedule item with schedule details associated with the second schedule item type.

18. The computer-implemented method of claim 16, wherein receiving the indication of movement of the first icon along the second axis comprises:
  receiving an indication of movement of the first icon to an interval along the second axis perpendicular to the first axis, the interval associated with the second schedule item type, wherein the second axis is comprised of a plurality of intervals, and wherein each interval is associated with a particular schedule item type.

19. A computer-implemented method for creating a new schedule item, comprising:
  displaying a schedule in a user interface;
  responsive to receiving a selection of a quick item creation button, updating the user interface to display a first icon designating a first schedule item type at a first timeslot of a plurality of timeslots displayed along a first axis in the user interface;
  receiving a selection of the first icon and an indication of movement of the first icon along a second axis;
  as the first icon is moved along the second axis, toggling between a plurality of other icons designating a plurality of other schedule item types at the first timeslot, the plurality of other icons including at least a second icon designating a second schedule item type;
  updating the user interface to transform the first icon to each of the plurality of other icons at the first timeslot as the plurality of other icons are toggled between; and
  responsive to receiving an indication of a committal input associated with the second icon, creating a schedule item of the second schedule item type within the schedule at the first timeslot.

20. The computer-implemented method of claim 19, wherein the receiving the indication of the committal input comprises one of:
  receiving an indication of a selection of a commit button; and
  receiving an indication of a selection of a commit command.

* * * * *